United States Patent
Kulkarni et al.

(10) Patent No.: US 10,389,697 B1
(45) Date of Patent: *Aug. 20, 2019

(54) SOFTWARE CONTAINER ACTIVATION AND THROTTLING

(71) Applicant: Amazon Technologies, Inc., Reno, NV (US)

(72) Inventors: Vijay Ravindra Kulkarni, Seattle, WA (US); Kevin Michael Beranek, Seattle, WA (US); Keian Christopher, Seattle, WA (US); Chris Hasz, Seattle, WA (US); Samuel Leonard Moniz, Seattle, WA (US); Kyle Bradley Peterson, Seattle, WA (US); Ajit Ashok Varangaonkar, Kirkland, WA (US); Jun Xu, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,862

(22) Filed: Sep. 26, 2014

Related U.S. Application Data

(60) Provisional application No. 62/042,560, filed on Aug. 27, 2014.

(51) Int. Cl.
  *H04L 29/06* (2006.01)
  *H04L 29/08* (2006.01)
(52) U.S. Cl.
  CPC .............. *H04L 63/08* (2013.01); *H04L 67/02* (2013.01); *H04L 67/30* (2013.01)
(58) Field of Classification Search
  CPC . G06F 17/30; G06F 7/04; G06F 15/16; H04L 63/08; H04L 29/06; H04L 67/02; H04L 67/30

(Continued)

(56) References Cited

U.S. PATENT DOCUMENTS

| 5,630,049 A | 5/1997 | Cardoza et al. |
| 6,205,449 B1 | 3/2001 | Rastogi et al. |

(Continued)

OTHER PUBLICATIONS

Office action for U.S. Appl. No. 14/498,880, dated Oct. 28, 2015, Beranek et al., "Software Container Activation and Throttling", 19 pages.

(Continued)

*Primary Examiner* — Harunur Rashid
*Assistant Examiner* — Sakinah Taylor
(74) *Attorney, Agent, or Firm* — Lee & Hayes, P.C.

(57) ABSTRACT

Technologies are described herein for managing the activation of software containers, for throttling of requests directed to tenants executing in a software container, and for priming the execution of software containers. The activation of software containers and tenants may be managed by maintaining an activation queue for storing requests to activate software containers or tenants on a host computer. Requests may be retrieved from the queue and utilized to determine whether a software container or a tenant is to be activated on a host. "Bounce" or hot swap tenant activations may be performed. Tenant activation requests might also be throttled by denying the requests or by postponing the requests until a later time. A software container might also be configured to throttle incoming requests to tenants executing therein. The execution of a software container might also be primed by replaying previously recorded network traffic to the software container.

21 Claims, 8 Drawing Sheets

(58) Field of Classification Search
USPC .......................................................... 726/4
See application file for complete search history.

(56) References Cited

U.S. PATENT DOCUMENTS

| | | | |
|---|---|---|---|
| 6,253,334 B1* | 6/2001 | Amdahl | G06F 1/20 709/239 |
| 6,981,180 B1 | 12/2005 | Bailey et al. | |
| 7,882,496 B2 | 2/2011 | Cognigni et al. | |
| 7,891,004 B1* | 2/2011 | Gelvin | H04L 67/12 701/24 |
| 7,899,901 B1* | 3/2011 | Njemanze | G06F 21/552 709/223 |
| 7,954,090 B1 | 5/2011 | Qureshi et al. | |
| 8,001,422 B1 | 8/2011 | Sun et al. | |
| 8,015,549 B2 | 9/2011 | Cooper et al. | |
| 8,112,262 B1 | 2/2012 | Michelsen | |
| 8,194,552 B1* | 6/2012 | Ye | H04L 43/50 370/235 |
| 8,291,387 B2 | 10/2012 | Pal et al. | |
| 8,327,334 B2 | 12/2012 | Chockler et al. | |
| 8,448,131 B2 | 5/2013 | Ottavi et al. | |
| 8,539,080 B1 | 9/2013 | Uluderya et al. | |
| 8,826,239 B2 | 9/2014 | Sawano | |
| 8,832,657 B1 | 9/2014 | Cowan et al. | |
| 8,843,910 B1 | 9/2014 | Schwerin et al. | |
| 8,966,464 B1* | 2/2015 | Christopher | G06F 11/0712 717/166 |
| 8,990,778 B1 | 3/2015 | Allocca et al. | |
| 9,081,899 B2 | 7/2015 | Ahmed et al. | |
| 9,836,388 B1* | 12/2017 | Moniz | G06F 11/3672 |
| 9,912,517 B1 | 3/2018 | Ramalingam et al. | |
| 2002/0129241 A1* | 9/2002 | Doyle | H04L 63/08 713/157 |
| 2003/0217166 A1* | 11/2003 | Dal Canto | H04L 63/0272 709/229 |
| 2004/0064818 A1* | 4/2004 | Alverson | G06F 9/461 718/107 |
| 2004/0205695 A1 | 10/2004 | Fletcher | |
| 2005/0257086 A1 | 11/2005 | Triou, Jr. et al. | |
| 2006/0101476 A1 | 5/2006 | Robert | |
| 2006/0129988 A1 | 6/2006 | Calsyn et al. | |
| 2006/0256763 A1* | 11/2006 | Nguyen | H04L 63/06 370/338 |
| 2007/0050686 A1 | 3/2007 | Keeton et al. | |
| 2007/0050768 A1* | 3/2007 | Brown | G06F 9/5027 718/100 |
| 2008/0059750 A1 | 3/2008 | Ogawa | |
| 2008/0097995 A1 | 4/2008 | Dias et al. | |
| 2008/0229280 A1 | 9/2008 | Stienhans | |
| 2008/0229284 A1 | 9/2008 | Castro et al. | |
| 2008/0250097 A1 | 10/2008 | Angelini et al. | |
| 2008/0282112 A1 | 11/2008 | Bailey et al. | |
| 2008/0282233 A1 | 11/2008 | Sheppard | |
| 2009/0132999 A1 | 5/2009 | Reyes | |
| 2009/0307533 A1 | 12/2009 | Niikkonen et al. | |
| 2010/0125612 A1* | 5/2010 | Amradkar | H04L 63/0807 707/802 |
| 2010/0162050 A1 | 6/2010 | Cathro | |
| 2010/0305983 A1 | 12/2010 | De Marcken | |
| 2010/0325616 A1 | 12/2010 | Singonahalli et al. | |
| 2010/0325642 A1* | 12/2010 | Paramasivam | G06F 11/0757 719/317 |
| 2011/0145790 A1 | 6/2011 | Rajaraman et al. | |
| 2011/0145795 A1 | 6/2011 | Khanapurkar et al. | |
| 2011/0161488 A1 | 6/2011 | Anderson et al. | |
| 2011/0173591 A1 | 7/2011 | Prasad | |
| 2011/0222407 A1 | 9/2011 | Matsuo et al. | |
| 2011/0231822 A1 | 9/2011 | Sabin et al. | |
| 2012/0047492 A1 | 2/2012 | Huang et al. | |
| 2012/0054447 A1 | 3/2012 | Swart et al. | |
| 2012/0072762 A1* | 3/2012 | Atchison | G06F 9/5072 714/2 |
| 2012/0084433 A1 | 4/2012 | Bar-Caspi et al. | |
| 2012/0084605 A1 | 4/2012 | Shilon et al. | |
| 2012/0084753 A1 | 4/2012 | Maybee et al. | |
| 2012/0159523 A1 | 6/2012 | Kulkarni et al. | |
| 2012/0221513 A1 | 8/2012 | Papadomanolakis et al. | |
| 2012/0221768 A1 | 8/2012 | Bagal et al. | |
| 2012/0290571 A1 | 11/2012 | Lee et al. | |
| 2012/0291014 A1 | 11/2012 | Shrinivasan | |
| 2013/0117609 A1 | 5/2013 | Dande et al. | |
| 2013/0124807 A1* | 5/2013 | Nielsen | G06F 11/1438 711/162 |
| 2013/0145006 A1* | 6/2013 | Tammam | G06F 9/5027 709/223 |
| 2013/0198226 A1 | 8/2013 | Dhuse et al. | |
| 2013/0275877 A1 | 10/2013 | Varner et al. | |
| 2013/0298183 A1* | 11/2013 | McGrath | G06F 9/455 726/1 |
| 2013/0318512 A1* | 11/2013 | Kuppala | G06F 9/44526 717/166 |
| 2014/0026122 A1 | 1/2014 | Markande et al. | |
| 2014/0040883 A1 | 2/2014 | Tompkins | |
| 2014/0047140 A1 | 2/2014 | Otenko et al. | |
| 2014/0068567 A1 | 3/2014 | Smith et al. | |
| 2014/0068611 A1* | 3/2014 | McGrath | G06F 9/45533 718/1 |
| 2014/0365554 A1* | 12/2014 | Bleau | H04L 67/1002 709/203 |
| 2016/0044531 A1 | 2/2016 | Papa et al. | |
| 2016/0239343 A1* | 8/2016 | Holt | G06F 9/485 |

OTHER PUBLICATIONS

Office action for U.S. Appl. No. 13/797,641, dated Mar. 16, 2016, Allocca et al., "Optimization of Production Systems", 23 pages.
Office action for U.S. Appl. No. 14/641,177, dated Mar. 24, 2016, Allocca et al., "Shadow Test Replay Service", 22 pages.
Office action for U.S. Appl. No. 14/641,177 dated Sep. 14, 2015, Allocca et al., "Shadow Test Replay Service", 20 pages.
Office action for U.S. Appl. No. 13/797,641 dated Sep. 8, 2015, Allocca et al., "Optimization of Production Systems ", 17 pages.
Office action for U.S. Appl. No. 13/797,641, dated Oct. 26, 2016, Allocca et al., "Optimization of Production Systems", 18 pages.
Office action for U.S. Appl. No. 14/498,874, dated Sep. 23, 2016, Kulkarni et al., "Software Container Activation and Throttling", 23 pages.
Office action for U.S. Appl. No. 14/498,880 dated Jun. 6, 2016, Beranek et al., "Software Container Activation and Throttling", 26 pages.
Office action for U.S. Appl. No. 14/641,177, dated Jul. 15, 2016, Allocca et al., "Shadow Test Replay Service", 59 pages.
Andrica et al., "WaRR: A tool for high-fidelity web application record and replay", IEEE, 2011, pp. 403-410.
Office action for U.S. Appl. No. 14/498,880 dated Feb. 21, 2017, Beranek et al., "Software Container Activation and Throttling", 28 pages.
Office action for U.S. Appl. No. 14/498,874, dated Feb. 3, 2017, Kulkarni et al., "Software Container Activation and Throttling", 29 pages.
Tsai et al., "A noninterference monitoring and replay mechanism for real-time software testing and debugging," IEEE Transactions on Software Engineering, vol. 16, Issue 8, Aug. 1990, pp. 897-916.
Wang et al., "Real application testing with database replay," 2009, DBTest '09, ACM, 2009, 6 pages.
Office Action for U.S. Appl. No. 14/038,583, dated Oct. 10, 2014, Samuel Leonard Moniz, "Duplicating Proxy Service", 43 pages.
Office Action for U.S. Appl. No. 14/038,619, dated Oct. 14, 2014, Samuel Leonard Moniz, "Duplicating Proxy Service", 43 pages.
Office action for U.S. Appl. No. 14/038,619, dated Oct. 6, 2016, Moniz et al., "Duplicating Proxy Service", 61 pages.
Office action for U.S. Appl. No. 14/038,619 dated Feb. 10, 2016, Moniz et al., "Duplicating Proxy Service", 63 pages.
Office action for U.S. Appl. No. 14/038,583, dated Feb. 11, 2016, Moniz et al., "Duplicating Proxy Service ", 53 pages.

(56) References Cited

OTHER PUBLICATIONS

Final Office Action for U.S. Appl. No. 14/038,619, dated Mar. 13, 2015, Samuel Leonard Moniz, "Duplicating Proxy Service", 48 pages.
Office Action for U.S. Appl. No. 14/038,583, dated Mar. 19, 2015, Samuel Leonard Moniz, "Duplicating Proxy Service", 43 pages.
Office action for U.S. Appl. No. 14/038,619, dated Mar. 8, 2017, Moniz et al., "Duplicating Proxy Service", 61 pages.
Office action for U.S. Appl. No. 13/797,641, dated Apr. 25, 2017, Allocca et al., "Optimization of Production Systems", 23 pages.
Office action for U.S. Appl. No. 14/038,583, dated Jul. 14, 2016, Moniz et al., "Duplicating Proxy Service", 54 pages.
Office action for U.S. Appl. No. 14/038,619, dated Aug. 26, 2015, Moniz et al., "Duplicating Proxy Service", 59 pages.
Office action for U.S. Appl. No. 14/038,583, dated Aug. 27, 2015, Moniz et al., "Duplicating Proxy Service", 51 pages.
Office Action for U.S. Appl. No. 14/498,880, dated Sep. 12, 2017, Beranek, "Software Container Activation and Throttling", 28 pages.
Office action for U.S. Appl. No. 13/797,641, dated Nov. 30, 2017, Allocca et al., "Optimization of Production Systems", 37 pages.
Office Action for U.S. Appl. No. 14/498,880 dated Apr. 9, 2018, Beranek et al., "Software Container ctivation and Throttling", 27 pages.
Office Action for U.S. Appl. No. 13/797,641, dated Jun. 18, 2018, Allocca, "Optimization of Production Systems", 31 pages.
Office Action for U.S. Appl. No. 14/498,880, dated Oct. 23, 2018, Beranek et al, "Software Container Activation and Throttling", 26 pages.

* cited by examiner

SOFTWARE CONTAINER ACTIVATION AND THROTTLING

CROSS-REFERENCE TO RELATED APPLICATIONS

This patent application claims the benefit of provisional U.S. patent application No. 62/042,560, filed on Aug. 27, 2014 and entitled "Software Container Activation and Throttling", which is expressly incorporated herein by reference in its entirety.

BACKGROUND

Various types of execution environments can be utilized to execute software applications. Execution environments can provide functionality for not only executing applications, but also for managing application execution and for providing other types of functionality. For example, one type of execution environment is a software container. Software containers may provide functionality for loading application dependencies, interconnecting applications at run time, and for managing application lifecycles, including integrated application deployment and eviction. Standard configuration mechanisms can typically be utilized to access this functionality.

Executing programs in an execution environment, such as a software container, may provide benefits over executing applications using traditional application architectures. For example, executing applications in a software container might permit applications to be constructed and deployed in a modular fashion by deploying the modules to a software container independently and interconnecting the modules at run time. Executing applications in a software container might also permit multiple applications, which may be referred to herein as "tenants," to execute in-process in the same multi-tenant software container, thereby sharing common frameworks in memory and potentially reducing resource utilization.

It is with respect to these and other considerations that the disclosure made herein is presented.

DETAILED DESCRIPTION

Figure 1:
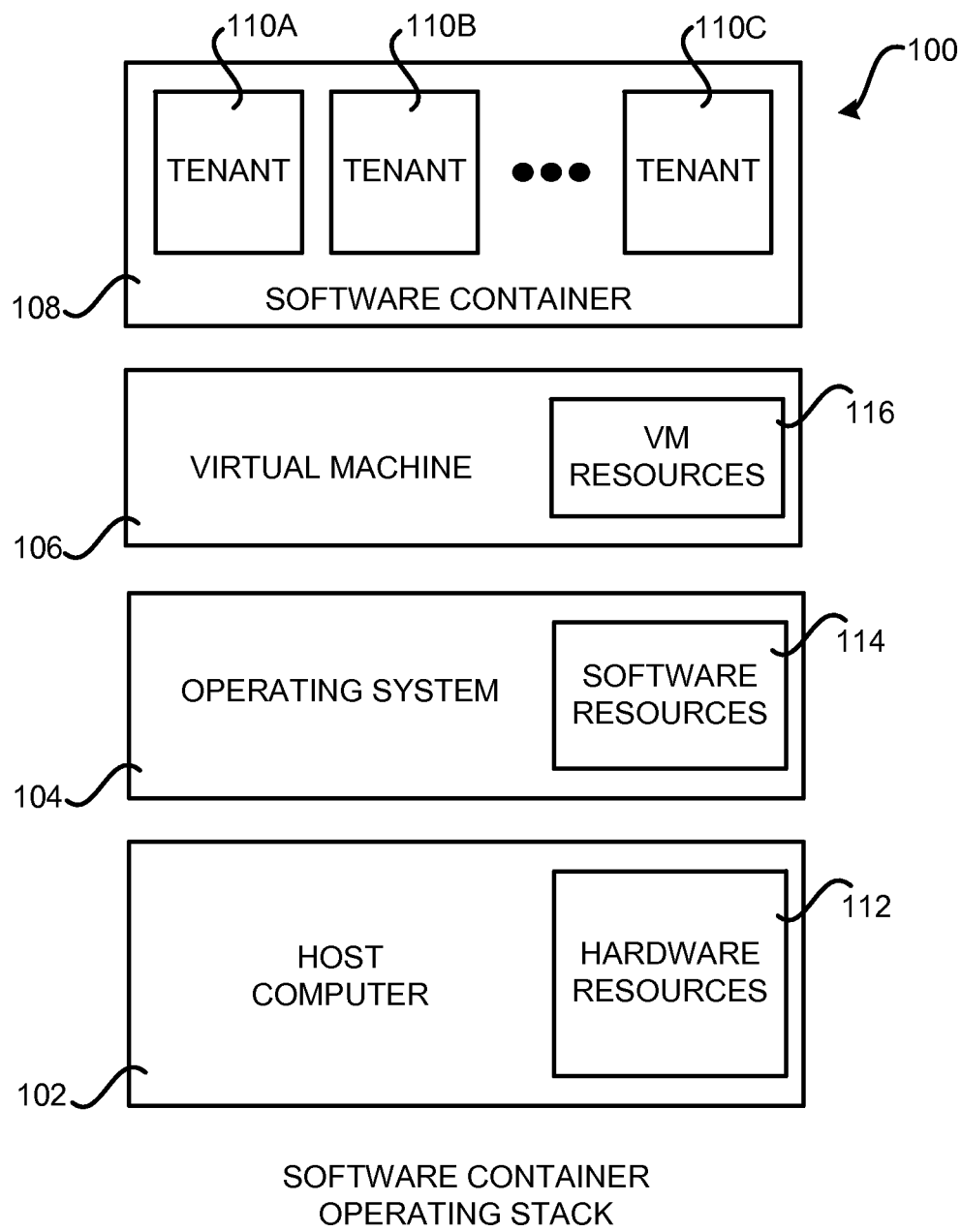
FIG. 1 is a stack diagram showing aspects of one illustrative operating environment for the technologies disclosed herein.

The following detailed description is directed to technologies for managing the activation of software containers, for throttling requests directed to the tenants of a software container, and for priming software containers. In particular, mechanisms for managing the activation of software containers are provided that, among other things, permit the independent activation of software containers and tenants on a host computer and for throttling of tenant activation requests. Mechanisms for throttling requests directed to the tenants of a software container are also provided that may be utilized to throttle incoming requests directed to a single tenant or multiple tenants executing in-process within a software container. Mechanisms for performing a "bounce" activation of tenants in a software container and for priming software containers for operation prior to placing the software containers into service are also disclosed.

As discussed briefly above, the mechanisms disclosed herein may be implemented in conjunction with a software container (which might also be called a "Web container", "an application container", or a "servlet container"). As also mentioned briefly above, a software container can provide functionality for executing applications, loading application dependencies, interconnecting applications at run time, for managing application lifecycles, including integrated application deployment and eviction, and other types of functionality. A multi-tenant software container is a software container configured to execute applications in process on behalf of two or more tenants. It should be appreciated that while the technologies disclosed herein are primarily presented in the context of a multi-tenant software container, the technologies disclosed herein might also be utilized with other types of multi-tenant execution environments.

According to one aspect presented herein, a mechanism is provided for managing the activation of software containers. Using this mechanism, an activation process is executed on a host computer at or around the time a software container or a tenant is deployed to the host computer. For example, a tenant activation process might be executed when a tenant is deployed to a host computer and a software container activation process might be executed when a software container is deployed to the host computer. As used herein, the term "deployment" generally refers to making a software component available on a computer.

The activation process is configured to place an activation request for the associated software container or tenant on an activation queue. The activation queue might be stored locally on a file system of the host computer, maintained by a network service, stored in a remote network location, or implemented in another way. The activation queue might be a first-in first-out ("FIFO") queue, a prioritized list, a stack, a tree, a random collection, or another type of data structure for maintaining an ordered list of software containers and/or tenants to be activated on a host computer. Because the term "queue" might be utilized herein to refer to various types of data structures, the phrase "collection of activation requests" might be utilized herein to generally refer to any data structure that might be utilized to store an activation request. Although a queue is utilized as a primary example in the text and Figures, it should be appreciated that the embodiments disclosed herein are not limited to use with a queue data structure.

In some configurations, an activation manager is also configured to execute on the host computer. The activation manager is configured to examine the activation queue to determine if a software container or a tenant is to be activated on the host computer. If the activation manager determines that a software container is to be activated on the host computer, the activation manager will cause the specified software container to be executed on the host computer.

If the activation manager determines that a tenant is to be activated on the host computer, the activation manager will cause the specified tenant to be executed in-process in a software container executing on the host computer. If a software container is not currently executing on the host computer, the activation of the tenant will be delayed until the software container begins executing on the host computer. Once the software container or tenant has been activated, the tenant activation process may be terminated. As discussed in greater detail below, the activation manager may also perform a "bounce" activation in which the software container is restarted prior to activation of a tenant or a "hot swap" activation in which the software container is not restarted. The software container might also be primed at activation time in the manner described below following restart by "replaying" previously recorded network traffic to the software container.

In some configurations, a software container executing on the host computer might be configured to examine the activation queue to determine if any tenants are to be activated and, if so, cause the tenants to be executed in the software container. Through the use of the activation queue in the manner described briefly above and in more detail below, software containers and tenants can be activated independently of one another.

The mechanisms disclosed herein for managed tenant and container activation might also be configured to provide functionality for throttling of tenant activation requests. For example, tenant activation requests might be throttled based upon the operational health of a software container, the operational health of a host computer upon which a software container is executing, the operational health of other software containers or host computers in a fleet, and/or other factors or considerations. A manual request might also be made to throttle the activation of tenants in a software container. Throttling of tenant activation requests might include postponing the activation of a tenant in a software container or denying a tenant activation request completely. Other types of throttling might also be implemented in some configurations. The throttling of tenant activation requests might also be overridden in some configurations. Additional details regarding the various mechanisms disclosed herein for managed tenant activation will be provided below with regard to FIGS. 2 and 3.

Mechanisms are also disclosed herein for throttling requests received at a software container that are directed to tenants executing within the software container. For example, in one particular configuration components executing internal or external to a software container may be configured to obtain operational health information regarding the software container itself, regarding the tenants executing within the software container, and/or about the host computer upon which the software container is executing. The software container might also be configured to obtain operational health information regarding other host computers in a fleet, regarding other software containers executing on other host computers within a fleet, and/or regarding other tenants executing in software containers on other host computers within a fleet. Other types of operational health information might also be obtained from other sources or services.

In some configurations, the software container is also configured to determine whether incoming requests directed to some or all of the tenants executing in the software container are to be throttled based upon the collected operational health information and/or other information. For example, and without limitation, the software container might determine that a particular tenant executing therein is utilizing an excessive amount of a particular computing resource (e.g. RAM, disk, or CPU) and that, therefore, incoming requests to the tenant are to be throttled. In this regard, it should be appreciated that the determination as to whether to throttle tenants in a software container may be made on a tenant-by-tenant basis. Other factors and/or considerations might also be utilized when determining whether to throttle incoming requests for a particular tenant in a software container. Additionally, in some configurations, incoming requests for one or more tenants may be throttled by a software container in response to receiving a request to throttle the incoming requests, such as from a management console or other type of fleet management system.

The throttling of incoming requests might be implemented in various ways in various configurations. For example, and without limitation, requests for a particular tenant in a software container might be throttled by rejecting at least a portion of the incoming requests. In another configuration, incoming requests for a tenant may be throttled by queuing at least a portion of the incoming requests for the tenant. The requests that have been queued may be provided to a tenant for processing at a later time (i.e. some time after the requests were received at the software container). For example, a software container may queue incoming tenant requests while a host computer is experiencing high utilization of computing resources (e.g. utilizing a high percentage of RAM, CPU, or disk storage). Once the host computer has returned to normal operation (i.e. the host computer is no longer experiencing high resource utilization), the queued tenant requests may be provided to the appropriate tenants for processing. A routing component might be utilized in some configurations to throttle requests in some configurations. Other mechanisms might also be utilized to throttle incoming requests to tenants executing in a software container in other configurations. Additional details regarding the various mechanisms disclosed herein for throttling incoming requests to tenants in a software container will be provided below with regard to FIGS. 4 and 5.

As discussed briefly above, mechanisms are also provided herein for performing a "bounce" activation of a tenant into a software container. A "bounce" activation of a tenant is an activation of a tenant into a software container during which the software container is shut down and restarted prior execution of the tenant in the software container. In order to provide this functionality, a tenant might specify in an activation request whether the activation is to be a "bounce" activation in which the software container is restarted prior to execution of the tenant or a "hot swap" activation in which the software container is not restarted.

As discussed above, the activation manager may retrieve activation requests from the activation queue. When the activation manager retrieves an activation request from the activation queue, the activation manager may determine whether the activation request is for a "bounce" activation or a "hot swap" activation. If the activation manager determines that a "hot swap" activation is to be performed, the activation manager may activate the tenant in the software container without restarting the software container first.

If the activation manager determines that a "bounce" activation is to be performed, the activation manager may determine whether the tenant has authorization to perform a "bounce" activation. For example, and without limitation, the activation manager may obtain authorization data from a networked authorization system that indicates whether the tenant has authorization to request a "bounce" activation. If the tenant is not authorized to perform a "bounce" activation, a "hot swap" activation might be performed for the requesting tenant. Alternately, the activation request may be denied.

If the requesting tenant is authorized to perform a "bounce" activation, the activation manager may shut down the software container in an orderly fashion. For example, the software container may be instructed to complete the processing of any outstanding requests prior to shutting down. Once the software container has been shut down, the activation manager causes the software container to restart execution. Once execution of the software container has been restarted, the tenant that requested activation may be executed in-process in the software container. It should be appreciated that, in other configurations, a mechanism might be provided for restarting a software container in a similar fashion to that described above in response to the detection or occurrence of other conditions. Additional details regarding this process will be provided below with regard to FIG. 3B.

Mechanisms are also disclosed herein for priming a software container following the initial execution of the software container or following a restart. In order to provide this functionality, typical network traffic that is received and processed by a software container may be recorded. Once the software container has been activated, the previously recorded network traffic (which might be referred to herein as "shadow traffic") may be "replayed" (i.e. transmitted) to the software container in order to optimize execution of the software container. Once the execution of the software container has been optimized in this fashion, the software container may be added to a load balancer or other network infrastructure device or service in order to configure the software container for processing live network traffic. Because the software container has been primed in the manner described above, the software container may immediately begin processing requests in an optimized fashion. Additional details regarding this process are provided below with regard to FIG. 6.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, cellular telephone devices, electronic-book readers, special-purposed hardware devices, network appliances, and the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

Operating Environment

FIG. 1 is a stack diagram showing aspects of one illustrative operating environment for the technologies disclosed herein, including several software and hardware components utilized in the various configurations disclosed herein. As shown in FIG. 1, the operating environment 100 includes a host computer 102 that may be utilized to execute an operating system 104. A virtual machine 106 and a multi-tenant software container 108 (which might also be called a "container", a "Web container", an "application container", or a "servlet container") are also provided that execute on the operating system 104. Multiple tenants 110A-110C (which may be referred to herein as "a tenant 110" or "the tenants 110") may be executed concurrently within the software container 108. The tenants 110 execute as threads in a process that executes the software container 108. It should be appreciated that while a virtual machine 106 is shown in FIG. 1, the software container 108 may be executed outside the virtual machine 106 in some configurations.

As mentioned above, the software container 108 might provide functionality for executing applications, loading application dependencies, interconnecting applications at run time, managing application lifecycles including integrated application deployment and eviction, multi-tenant execution, and other types of functionality. It should be appreciated that while the technologies disclosed herein are primarily presented in the context of a software container 108, the technologies disclosed herein might also be utilized with other types of containers and execution environments.

It should be appreciated that software containers are available for use in many development and execution environments. For example, software containers are commonly available that utilize the JAVA programming language from ORACLE CORPORATION. Examples of software containers include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEB-LOGIC, and FUSION from ORACLE CORPORATION. Although the configurations disclosed herein are primarily presented in the context of a software container 108, the configurations disclosed herein might also be utilized with other types of containers and with other types of execution environments.

Additional details regarding the operation, configuration and use of software containers, such as the software container 108, may be found in U.S. patent application Ser. No. 14/193,852, filed on Feb. 28, 2014 and entitled "Exposing a Container-Agnostic Method as a Service", U.S. patent application Ser. No. 14/298,603, filed on Jun. 6, 2014 and entitled "Deployment and Management of Tenant Services", U.S. patent application Ser. No. 14/163,883, filed on Jan. 24, 2014 and entitled "Aggregated Health Check of a Multi-Tenant Service Container", U.S. patent application Ser. No. 13/800,783, filed on Mar. 13, 2013 and entitled "Modification of Program Code for Execution in a Multi-Tenant or Distributed Computing Environment", and U.S. patent application Ser. No. 14/222,564, filed on Mar. 21, 2014 and entitled "Isolating Tenants Executing in Multi-Tenant Software Containers", all of which are expressly incorporated herein by reference in their entirety.

As shown in FIG. 1, the host computer 102 provides various hardware resources 112 that may be utilized by the tenants 110 executing in the software container 108. For example, and without limitation, hardware resources 112 include, but are not limited to, CPU cycles, system memory, mass storage, disk I/O and bandwidth, and network I/O and bandwidth. The host computer 102 might also provide other types of hardware resources 112 for utilization by the tenants 110.

As also shown in FIG. 1, the operating system 104 might provide various types of software resources 114 for use by the tenants 110. For example, and without limitation, the software resources 114 include, but are not limited to, load balancer connections, file descriptors, and other types of software resources 114. The virtual machine 106 might also provide virtual machine resources 116 for use by the tenants 110. For example, and without limitation, the virtual machine resources 116 include, but are not limited to, heap, old generation, young generation, permanent generation, code cache, and execution threads. Other types of virtual machine resources 116 might also be provided.

It should be appreciated that the hardware resources 112, software resources 114, and virtual machine resources 116 (collectively "resources") described above are merely illustrative. In this regard, it should be further appreciated that the operating environment 100 illustrated in FIG. 1 is merely illustrative and that the configurations disclosed herein might be utilized in other types of operating environments and with other types of containers.

It should also be appreciated that the software container operating stack shown in FIG. 1 might be utilized in a services oriented architecture ("SOA") environment (not shown in FIG. 1). A SOA environment is a computing environment that is implemented utilizing a SOA. As known to those skilled in the art, a SOA allows services to be implemented that provide functionality to other services and/or applications. The services may be unassociated, loosely coupled and self-contained. The functionality provided by services in the SOA environment may be combined in order to implement aspects of an application using the SOA environment.

The services in the SOA environment may utilize various mechanisms to describe the services themselves, such as the Web Services Description Language ("WSDL"). Various mechanisms might also be utilized to describe the protocols utilized for inter-service communication, such as the Simple Object Access Protocol ("SOAP"). Various transport mechanisms might also be utilized to enable communication between the services in the SOA environment, such as the Hypertext Transfer Protocol ("HTTP"). It should be appreciated that other transport mechanisms might also be utilized. Additionally, other technologies might also be utilized for service discovery and service communication.

Services in a SOA environment are interconnected by one or more networks (not shown in FIG. 1). The networks may be local area networks ("LANs"), wide area networks ("WANs"), the Internet, or any combination of these or other types of networks. In this regard, it should be appreciated that the SOA environment described herein has been greatly simplified for discussion purposes, and that the SOA environment may include many more services, systems, networks, and other components than described. Many other technologies may be utilized to implement services in a SOA environment that will be apparent to those skilled in the art. Additionally, although the technologies described herein are primarily described as operating within an SOA environment, these technologies might be utilized in other operating environments in other configurations.

As mentioned briefly above, aspects of the various technologies disclosed herein might be implemented in conjunction with a software container 108 executing on a host computer 102 in a SOA environment. As also mentioned briefly above, the software container 108 might provide functionality for executing applications, loading application dependencies, interconnecting applications at run time, managing application lifecycles including integrated application deployment and eviction, multi-tenant execution, and other types of functionality.

Managed Tenant and Container Activation

Figure 2:
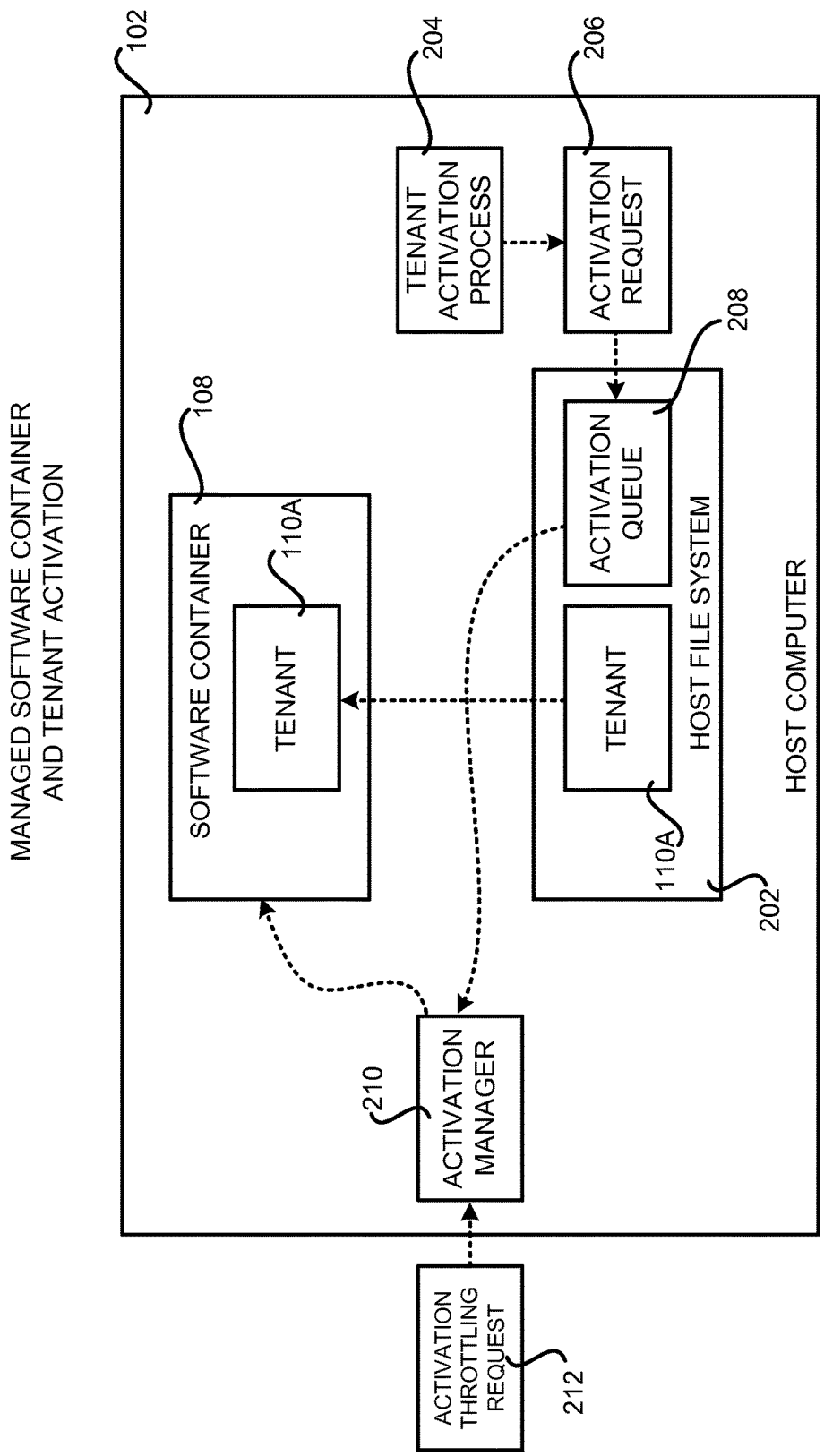
FIG. 2 is a software architecture diagram showing aspects of the operation of one mechanism disclosed herein for managed tenant and container activation.

FIG. 2 is a software architecture diagram showing aspects of the operation of one mechanism disclosed herein for managed tenant and container activation. As shown in FIG. 2, a host computer 102 may include a host file system 202 that stores various types of files. For example, a deployment system (not shown in FIG. 2) may deploy a tenant 110A to the host file system 202. At or around the time of deployment, a tenant activation process 204 (which might be referred to as an "activation process 204") might also be executed on the host computer 102. As will be described in detail below, the tenant activation process 204 triggers the activation of the tenant 110A on the host computer 102. Activation refers to a process by which a software container 108 is executed on a host computer 102 or by which a tenant 110 is executed in a software container 108. As will be described in greater detail below, the tenant 110A may be deployed to the host computer 102 and the tenant activation process 204 may be executed even if no software container 108 is currently executing on the host computer 102.

The tenant activation process 204 is configured to place an activation request 206 for the associated tenant 110A on an activation queue 208. In the example configuration shown in FIG. 2, the activation queue 208 is stored locally on the file system 202 of the host computer 102. In other configurations, the activation queue 208 might be stored in a network connected data store, be maintained by a network service (not shown in FIG. 2), or implemented in another way. The activation queue 208 might be a FIFO queue, a prioritized list, or another type of data structure for maintaining an ordered list of software containers 108 and/or tenants 110 to be activated on a host computer 102. When the activation queue 208 is implemented as a prioritized list, tenants 110 may be permitted to specify their priority so that they are activated out of FIFO order. Similarly, tenants 110 might also be permitted to specify dependencies and/or other information for use in determining the order in which the tenants 110 are activated in the software container 108.

In some configurations, an activation manager 210 is also configured to execute on the host computer 102. The activation manager 210 is configured to examine the contents of the activation queue 208 to determine if a tenant 110 is to be activated on the host computer 102. If the activation manager 210 determines that a tenant 110, such as the tenant 110A shown in FIG. 2, is to be activated on the host computer 102, the activation manager 210 will cause the specified tenant 110A to be executed in-process in a software container 108 executing on the host computer 102. For example, in one configuration, the activation manager 210 provides an instruction to the software container 108 over HTTP instructing the software container 108 to activate the tenant 110A. It should be appreciated that other types of processes might also be utilized to perform the functionality described herein as being performed by the activation manager 210.

If a software container 108 is not currently executing on the host computer 102, the activation of the tenant 110A may be delayed until the software container 108 begins executing on the host computer 102. In this way, the activation of software containers 108 and tenant 110 on a host computer 102 can be performed independently of one another.

Once a tenant 110A has been activated, the associated tenant activation process 204 may be terminated. For example, the tenant activation process 204 might poll the software container 108 to determine if the associated tenant 110 has been activated. If so, the tenant activation process 204 may terminate itself. In some configurations, the software container 108, rather than the activation manager 210, is configured to directly examine the activation queue 208 to determine if any tenants 110 are to be activated and, if so, to cause the specified tenants 110 to be activated in the software container 108.

A software container 108 can also be activated on the host computer 102 using a mechanism similar to that described above. For example, a software container 108 might be deployed to the host file system 202 and an activation process for the software container 108 executed on the host computer 102. The activation process for the software container 108 may place an activation request 206 for the software container 108 on the activation queue 208. In turn, the activation manager 210 may de-queue the request from the activation queue 208 and begin execution of the software container 108. Once the software container 108 is able to begin executing tenants 110, the activation manager 210 or the software container 108 may begin de-queueing tenant activation requests 206 from the activation queue 208 and activating the tenants 110 in the software container 108.

The mechanisms disclosed herein for managed tenant 110 and software container activation 108 might also be configured to provide functionality for throttling of tenant activation requests 206. For example, the activation manager 210 and/or the software container 108 might be configured to throttle the processing of activation requests 206 placed on the activation queue 208 based upon the operational health of the software container 108, the operational health of the host computer 102, the operational health of other software containers 108 or host computers 102 in a fleet, and/or other factors or considerations. For example, and without limitation, tenant activation requests 206 might be throttled if the host computer 102 or the software container 108 are receiving a volume of requests in excess of some specified threshold. Similarly, tenant activation requests 206 might also be throttled if a threshold percentage of the virtual machine resources 116, software resources 114, or hardware resources 112 are being utilized. Other factors and/or considerations might also trigger the activation manager 210 and/or the software container 108 to throttle tenant activation requests 206.

A manual activation throttling request 212 might also be made to throttle the activation of tenants 110 in a software container 108 in some configurations. For example, and without limitation, a management system (not shown in FIG. 2) might be configured to transmit an activation throttling request 212 to one or more activation managers 210 or software containers 108. The activation throttling request 212 instructs the activation manager 210 or the software container 108 to throttle activation requests 206 until instructed otherwise. As a specific example, an activation throttling request 212 might be transmitted in order to implement a 'code freeze' on one or more host computers 102. At a future point in time, an additional instruction might be provided to the activation manager 210 or the software container 108 to discontinue throttling of activation requests 206.

In some configurations, an activation request 206 might be configured to override the throttling of activation requests. In this way, an updated tenant 110 might be activated on a host computer 102 that is experiencing a high request rate and that has therefore implemented activation request throttling. This may be particularly useful when the updated tenant 110 includes a patch that fixes an operational problem with a previously activated version of the tenant 110. Other mechanisms might also be utilized to override the throttling of activation requests 206.

Throttling of tenant activation requests 206 might include postponing the activation of a tenant 110 in a software container 108 or denying a tenant activation request 206 completely. The particular type of activation request throttling that is implemented may be user configurable. Other types of throttling might be implemented in other configurations. Additional details regarding the mechanisms disclosed herein for managed activation of tenants and software containers will be provided below with regard to FIGS. 3A and 3B.

It should be appreciated that the configuration illustrated in FIG. 2 is illustrative and that other configurations might also be utilized. For example, it should be appreciated that the tenant activation process 204 and the activation manager 210 might be provided as network services that execute on a computer other than the host computer 102. Additionally, it should be appreciated that while the tenant 110A is illustrated as being stored on the host file system 202 in FIG. 2, the tenant 110A might be stored in another location such as, but not limited to, a network accessible storage location. Other configurations might also be utilized.

Figure 3A:
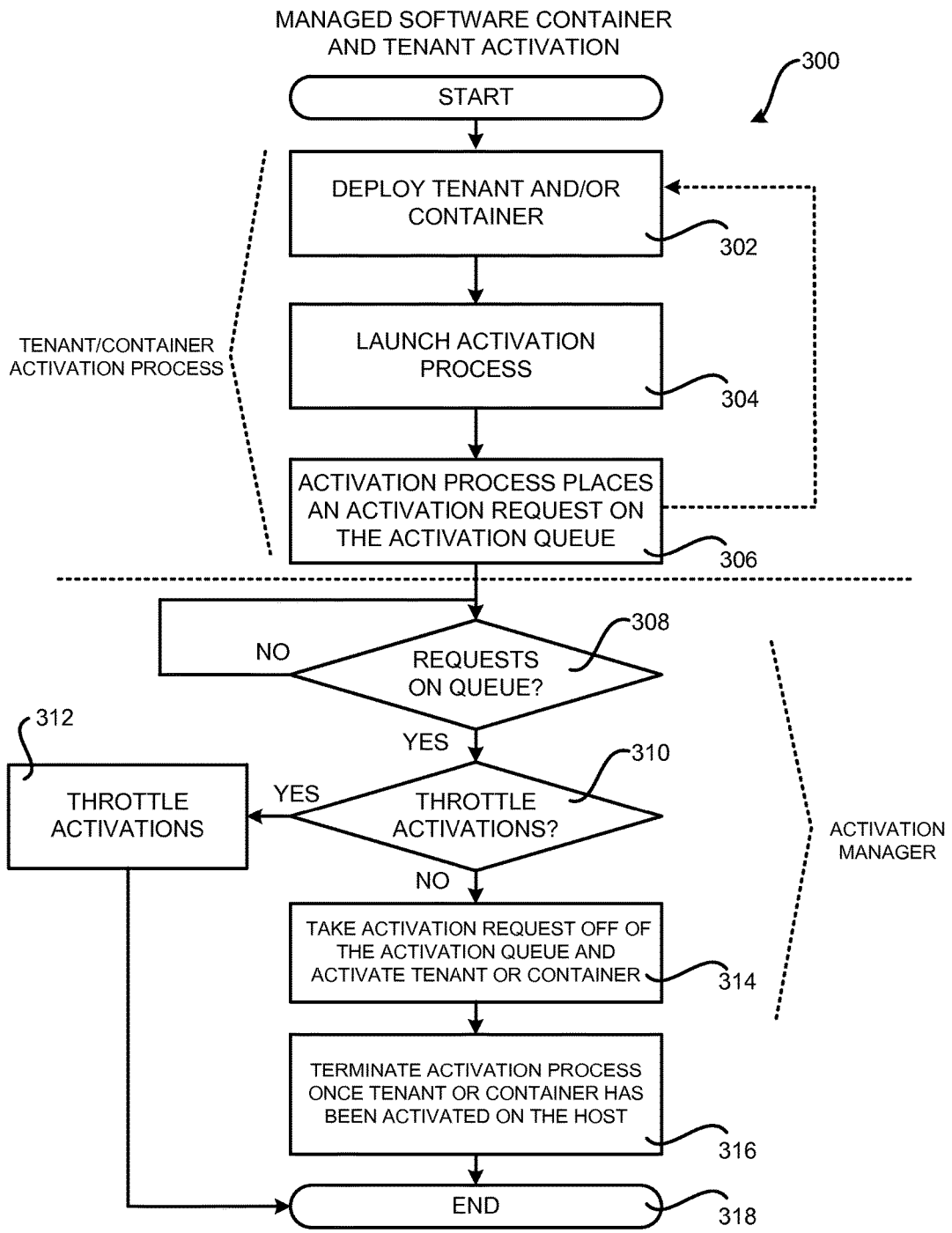
FIG. 3A is a flow diagram illustrating aspects of the operation of the mechanism shown in FIG. 2 for managed tenant and container activation.

FIG. 3A is a flow diagram showing a routine 300 that illustrates aspects of the operation of the mechanism shown in FIG. 2 and described above for managed tenant 110 and container 108 activation. It should be appreciated that the logical operations described herein with respect to FIG. 3A, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules.

These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 300 begins at operation 302, where a tenant 110 or a software container 108 may be deployed to the host file system 202 of a host computer 102. As discussed briefly above, a deployment system might be utilized to deploy the tenant 110 or the software container 108 to a host computer 102. As also discussed above, the tenant 110 or the software container 108 might be deployed to a network location accessible to the host computer 102. Once the tenant 110 or the software container 108 has been deployed in this manner, the routine proceeds from operation 302 to operation 304.

At operation 304, an activation process 204 begins execution on the host computer 102 for the deployed tenant 110 or software container 108. As discussed briefly above, the activation process 204 may begin execution at or around the time an associated tenant 110 or software container 108 is deployed to the host computer 102. As also discussed above, the activation process 204 might also be executed on a computer other than the host computer 102 in some configurations. Once the activation process begins execution, the routine 300 proceeds from operation 304 to operation 306.

At operation 306, the activation process 204 places an activation request 206 on the activation queue 208 for the associated tenant 110 or software container 108. For instance, in the example shown in FIG. 2, a tenant activation process 204 has placed an activation request 206 for a tenant 110A on the activation queue 208. An activation request 206 for a software container 108 might be placed on the activation queue 208 in a similar manner. As discussed above, the activation queue 208 might be stored on the host file system 202, in a remote network accessible location, maintained by a network service, or implemented in another manner. Additionally, the activation queue 208 might be a FIFO queue, a prioritized list, or another type of data structure that maintains a list of tenants 110 and software containers 108 to be activated on a host computer 102. The dashed line shown in FIG. 3A between operation 306 and operation 302 indicates that activation processes might be continually executed in order to place activation requests 206 on the activation queue 208 for tenants and containers in the manner described above.

From operation 306, the routine 300 proceeds to operation 308, where the activation manager 210 executing on the host computer 102, or another computer, examines the activation queue 208 to determine whether any activation requests 206 are on the queue 208. If no activation requests 206 are on the queue 208, the activation manager 210 may wait a period of time before again examining the activation queue 208. As discussed above, the software container 108 might similarly be configured to poll the activation queue 208 for tenant activation requests 206. In some configurations, the activation queue 208 might be configured to notify the activation manager 210 and/or the software container 208 when an activation request 206 has been placed on the queue 208 in order to avoid polling.

If the activation manager 210 or the software container 108 determines that an activation request 206 is on the activation queue 208, the routine 300 proceeds to operation 310. At operation 310, the activation manager 210 or the software container 108 determines whether activation requests 206 are to be throttled. As discussed above, this determination might be made based upon the operational health of the software container 108, the operational health of the host computer 102, the operational health of other software containers 108 or host computers in a fleet, and/or other factors or considerations. Additionally, and as described above, activation requests 206 might also be manually throttled in some configurations.

If activation requests 206 are to be throttled, the routine 300 proceeds from operation 310 to operation 312, where activations requests 206 on the activation queue 208 may be throttled. As discussed above, this might include denying an activation request 206 or postponing an activation request 206 until a future point in time. Other types of activation request throttling might also be implemented in other configurations.

If activation requests 206 are not to be throttled, the routine 300 proceeds from operation 310 to operation 314, where the activation request 206 is taken off of the activation queue 208. If the activation request 206 is to activate a software container 108 on the host computer 102, the activation manager 210 may cause the software container 108 specified in the activation request 206 to be executed on the host computer 102. If the activation request 206 is to activate a tenant 110 on the host computer 102, the activation manager 210 may first determine whether a software container 108 is currently executing on the host computer 102. If no software container 108 is currently executing on the host computer 102, the activation manager 210 might wait a period of time before trying to activate the tenant 110. If a software container 108 is currently executing on the host computer 102, the activation manager 210 (or the software container 108 itself) will activate the tenant 110 specified in the activation request 206 in the software container 108.

Once the tenant 110 or software container 108 has been activated on the host computer 102, the routine 300 proceeds from operation 314 to operation 316. At operation 316, the activation process 204 may be terminated. For example, in some implementations, the activation process 204 might be configured to poll the associated tenant 110 or software container 108 to determine if the associated tenant 110 or software container 108 has been activated. If the tenant 110 or software container 108 has been activated, the activation process 204 may terminate itself. Other mechanisms might also be utilized to terminate the activation process 204 for a tenant 110 or software container 108.

From operation 316, the routine 300 proceeds to operation 318, where it ends. Alternately, the routine 300 may proceed back to operation 302, where additional tenants 110 and/or software containers 108 might be deployed to the host computer 102 and activated in the manner described above.

Figure 3B:
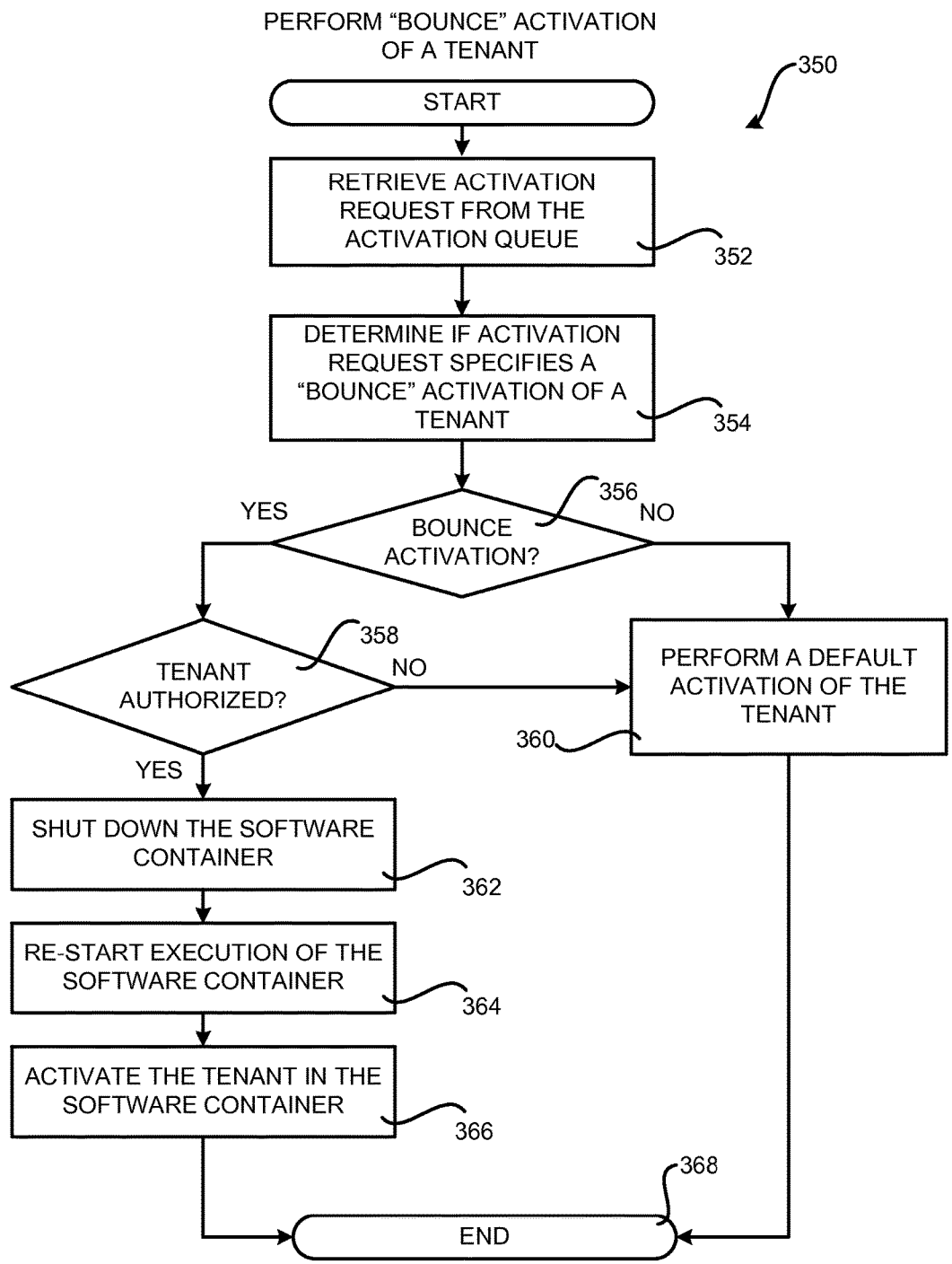
FIG. 3B is a flow diagram illustrating aspects of the operation of a mechanism disclosed herein for performing a "bounce" activation of a tenant in a software container.

FIG. 3B is a flow diagram showing a routine 350 that illustrates aspects of the operation of a mechanism disclosed herein for performing a "bounce" activation of a tenant 110 in a software container 108. As discussed briefly above, a "bounce" activation of a tenant 110 is an activation of a tenant 110 into a software container 108 during which the software container 108 is shut down and restarted prior execution of the tenant 110 in the software container. In order to provide this functionality, a tenant activation process 204 might specify in an activation request 206 whether the activation is to be a "bounce" activation in which the software container 108 is restarted prior to execution of the tenant 110 or a "hot swap" activation in which the software container 108 is not restarted.

As discussed above, the activation manager 210 may retrieve activation requests 206 from the activation queue 208. When the activation manager 210 retrieves an activation request 206 from the activation queue 208, the activation manager 210 may determine whether the activation request 206 is for a "bounce" activation or a "hot swap" activation. If the activation manager 210 determines that a "hot swap" activation is to be performed, the activation manager 210 may activate the tenant 110 in the software container 108 without restarting the software container 108 first.

If the activation manager 210 determines that a "bounce" activation is to be performed, the activation manager 210 may determine whether the requesting tenant 110 has authorization to perform a "bounce" activation. For example, and without limitation, the activation manager 210 may obtain authorization data from a networked authorization system (not shown in the FIGS.) that indicates whether the requesting tenant 110 has authorization to request a "bounce" activation. If the tenant 110 is not authorized to perform a "bounce" activation, a "hot swap" activation might be performed for the requesting tenant 110. Alternately, the activation manager 210 may deny the activation request 206.

If the requesting tenant 110 is authorized to perform a "bounce" activation, the activation manager 210 may shut down the software container 108 in an orderly fashion. For example, and as described briefly above, the software container 108 may be instructed to complete the processing of any outstanding requests 404 (shown in FIG. 4 and described below) prior to shutting down. Once the software container 108 has been shut down, the activation manager 210 causes the software container 108 to restart execution. Once execution of the software container 108 has been restarted, the activation manager 210 may instruct the software container 108 to activate the tenant 110 that requested activation for execution in-process in the software container 108. Additional details regarding this process will be provided below with regard to the routine 350 shown in FIG. 3B.

The routine 350 begins at operation 352, where the activation manager 210 retrieves a tenant activation request 206 from the activation queue 208. The routine 350 then proceeds from operation 352 to operation 354, where the activation manager 210 determines whether the activation request 206 specifies a "bounce" tenant activation or a "hot swap" tenant activation. If the activation request 206 specifies a "hot swap" tenant activation, the routine 350 proceeds from operation 356 to operation 360, where the tenant 110 is activated in the software container 108 without restarting the software container 108. The routine 350 then proceeds from operation 360 to operation 368, where it ends.

If, at operation 356, the activation manager 210 determines that the activation request 206 is for a "bounce" tenant activation, the routine 350 proceeds from operation 356 to operation 358. At operation 358, the activation manager 210 determines whether the requesting tenant 110 has authorization to perform a "bounce" activation. For example, and without limitation, the activation manager 210 may obtain authorization data from a networked authorization system (not shown in the FIGS.) that indicates whether the requesting tenant 110 has authorization to request a "bounce" activation. If the tenant 110 is not authorized to perform a "hot swap" activation, the routine 350 proceeds from operation 358 to operation 360, where a "hot swap" activation might be performed for the requesting tenant 110. Alternately, the activation manager 210 may deny the activation request 206 or queue the activation request 206 for processing at a future time.

In some configurations, the activation manager 210 might be configured to communicate with an external authorization system (not shown in the FIGS.) to obtain information describing the type of activations that a particular tenant 110 is authorized to perform. This information might then be utilized to perform the type of activation (e.g. a hot swap activation or a bounce activation) at the time an activation request is received for the tenant 110. In this configuration, the activation request 206 might not directly specify the type of activation to be performed. Rather, the activation manager 210 might communicate with the external authorization system, or another type of system, in order to determine the particular type of activation that should be performed for the tenant 110. The activation manager 210 might also communicate with an external authorization system in order to determine whether a tenant has authorization to perform an activation of either type. If a tenant is not authorized to request activation, then an activation request 206 received from the tenant may be denied.

In some configurations, the activation manager 210 might also be configured to queue or deny a request to perform a "bounce" activation based upon other factors and/or considerations. For example, if the host computer 102 or other host computers 102 in a fleet are under duress or experiencing other operational issues, the activation manager 210 might queue or deny a request to perform a "bounce" activation because performing a "bounce" activation might create further operational issues. In order to determine whether to queue or deny a "bounce" activation request, the activation manager 210 might consider some or all of the operational health information 406 discussed below with regard to FIG. 4. Other factors and/or considerations might also be evaluated by the activation manager 210 when determining whether to perform a requested "bounce" activation.

If, at operation 358, the activation manager 210 determines that the requesting tenant 110 is authorized to perform a "bounce" activation, the routine 350 proceeds from operation 358 to operation 362. At operation 362, the activation manager 210 instructs the software container 108 to shut down in an orderly fashion. For example, and as described briefly above, the software container 108 may be instructed to complete the processing of any outstanding requests 404 prior to shutting down. By shutting down the software container 108 in this way, any computing resources (e.g. RAM) utilized by the software container 108 and/or any tenants 110 executing therein are released.

Once the software container 108 has been shut down, the routine 350 proceeds from operation 362 to operation 364, where the activation manager 210 causes the software container 108 to restart execution. Once execution of the software container 108 has been restarted, the routine 350 proceeds from operation 364 to operation 366, where the activation manager 210 instructs the software container 108 to activate the tenant 110 that requested activation for execution in-process in the software container 108 at operation 352. The routine 350 then proceeds from operation 366 to operation 368, where it ends.

It should be appreciated that, in other configurations, a mechanism might be provided for performing a "bounce" activation of a tenant 110 in a software container 108 in a similar fashion to that described above in response to the detection or occurrence of other conditions. For example, and without limitation, the activation manager 210 might be configured to periodically perform a "bounce" activation for tenants 110 executing in a software container 108 in order to release all of the computing resources utilized by the software container 108 and the tenants 110. Similarly, the activation manager 210 or the software container 108 might be configured to expose a network service API through which requests to perform a "bounce" activation for the tenants 110 in the software container 108.

In another configuration, the software container 108, the activation manager 210, or another component might be configured to monitor the operational state of the tenants 110 executing in the software container 108. If a tenant 110 is experiencing operational issues, such as a memory leak, excessive heap usage, or another problematic condition, the activation manager 210 might perform a "bounce" activation for the tenants 110 executing in the software container 108. A "bounce" activation might also be performed in response to the occurrence of other types of conditions including, but not limited to, a change to the configuration of the software container 108 or the tenants 110, deployment of a new tenant 110 to a host computer 102, deployment of a software update to an existing tenant 110 on a host computer 102, and/or in response to the occurrence of other types of events or conditions. In this way, a software container 108 and/or the tenants 110 can be reinitialized in an automated fashion in response to the occurrence of certain types of events of conditions.

It should also be appreciated that the mechanism described above with regard to FIGS. 3A and 3B might also be utilized to perform other types of activation related tasks. For example, and without limitation, an activation process 204 might specify other tasks or workflows that are to be performed in conjunction with the activation of a tenant 110 or a container 108.

Throttling of Tenant Requests

Figure 4:
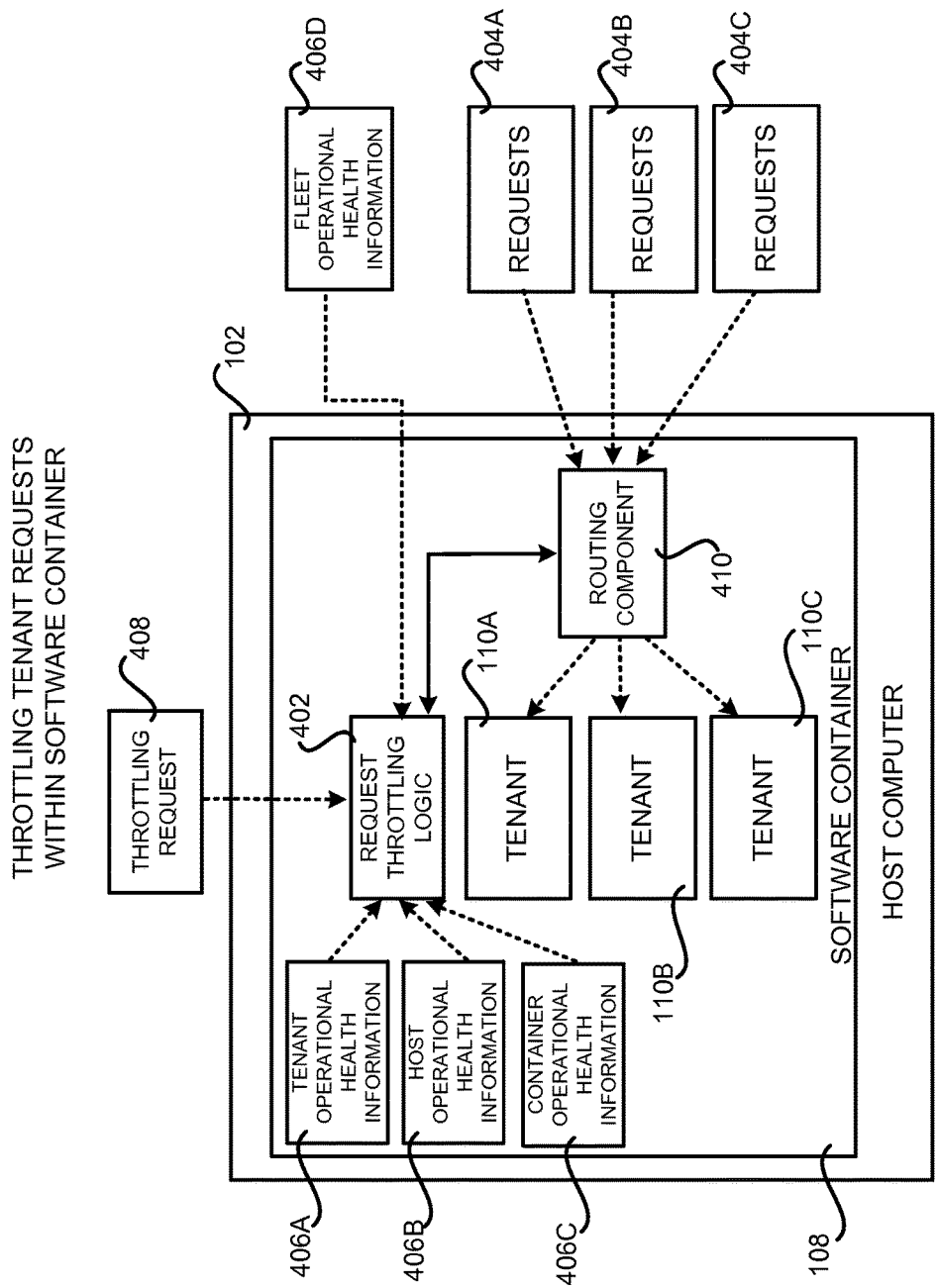
FIG. 4 is a software architecture diagram showing aspects of the operation of one mechanism disclosed herein for throttling requests directed to tenants of a software container.

FIG. 4 is a software architecture diagram showing aspects of the operation of one mechanism disclosed herein for throttling requests 404 directed to the tenants 110 of a software container 108. In order to implement this functionality, a software container 108 is configured with request throttling logic 402 and a routing component 410 in one particular configuration. As will be described in greater detail below, the request throttling logic 402 and the routing component 410 are configured to throttle incoming requests 404A-404C to the software container 108 for one or more of the tenants 110A-110C executing in-process in the software container 108.

In order to throttle incoming requests 404, the request throttling logic 402 may be configured to obtain operational health information 406. In particular, the request throttling logic 402 may be configured to obtain operational health information 406A regarding the tenants 110A-110C executing in the software container 108, operational health information 406B for the host computer 102 upon which the software container 108 is executing, and/or operational information 406C for the software container 108 itself. In some configurations, the request throttling logic 402 might also be configured to obtain operational health information 406D for other host computers, software containers, and/or tenants in a fleet. The request throttling logic 402 might also obtain other information from other external services and system upon which a decision whether to throttle requests for one or more tenants may be made. As will be described in greater detail below, the collected operational health information 406 and/or other information may be utilized by the request throttling logic 402 to determine whether requests 404 should be throttled for some or all of the tenants 110 executing in the software container 108.

The operational health information 406 provides an indication of the operational health of a particular software component or hardware device. For example, and without limitation, the operational health information 406 might indicate the quantity of computing resources utilized by a tenant 110, a software container 108, or a host computer 102. The operational health information 406 might also, or alternatively, indicate whether there is an operational issue with software component or hardware device. For example, the operational health information 406 might indicate whether a tenant 110, a software container 108, or a host computer 102 are experiencing operational issues that might impact their ability to process incoming requests 404. The operational health information 406 might provide other types of insight into the operational health of a tenant 110, a software container 108, or a host computer 102.

As mentioned briefly above, the request throttling logic 402 in the software container 102 may also be configured to determine whether incoming requests 404 directed to some or all of the tenants 110 executing in the software container 108 are to be throttled based upon some or all of the collected operational health information 406. For example, and without limitation, the request throttling logic 402 in the software container 108 might determine that a particular tenant 110A executing therein is utilizing an excessive amount of a particular computing resource (e.g. RAM, disk, or CPU) and that, therefore, incoming requests 404 to the tenant 110A are to be throttled. As also mentioned briefly above, the determination as to whether to throttle tenants 110 in a software container 108 may be made on a tenant-by-tenant basis. In this way, requests 406 destined for tenants 110 that are experiencing operational issues may be throttled while requests for other tenants 110 that are operating normally may not be throttled.

Other factors and/or considerations might be utilized when determining whether to throttle incoming requests 404 for a particular tenant 110 in a software container 102 in other configurations. Additionally, in some configurations, incoming requests 404 for one or more tenants 110 may be throttled by a software container 108 in response to receiving a request 408 to throttle the incoming requests 404, such as from a management console or other type of fleet management system (not shown in FIG. 4).

The throttling of incoming requests 404 to a software container 108 might be implemented in various ways in various configurations. For example, and without limitation, the routing component 410 may receive an instruction from the request throttling logic 402 to throttle requests 404 for one or more tenants 110. In response thereto, the routing component 410 might throttle requests 404 for a particular tenant 110 in the software container 108 by rejecting at least a portion of the incoming requests 404. In another configuration, the routing component 410 might throttle incoming requests 404 for a tenant 110 by queuing at least a portion of the incoming requests 404 for the tenant 110.

As discussed briefly above, requests 404 that have been queued by the routing component 410 may be provided to a tenant 110 for processing at a later time (i.e. some time after the requests 404 were received at the software container 108). For example, a software container 108 may queue incoming requests 404A for a particular tenant 110A while the tenant 110A is experiencing high resource utilization. Once the tenant 110A has returned to normal operation (i.e. the tenant 110A is no longer experiencing high resource utilization), the queued requests 404 for the tenant 110A may be provided to the tenant 110A for processing.

Other mechanisms might also be utilized to throttle incoming requests 404 to tenants 110 executing in a software container 108 in other configurations. In this regard, it should be appreciated that while the request throttling logic 402 and the routing component 410 are shown as executing within the software container 108 in FIG. 4, these components might execute external to the software container 108 or on another computer altogether in other configurations. Additional details regarding the various mechanisms disclosed herein for throttling incoming requests 404 to tenants 110 in a software container 108 will be provided below with regard to FIG. 5.

In some configurations, the routing component 410 might also be configured to throttle requests directed to the tenants 110 by performing various types of routing of the requests 404. For example, and without limitation, the routing component 410 might be configured to route requests 404 to a tenant 110 that is different than the tenant 110 to which they were originally directed. For example, requests 404 for a tenant 110 might be routed to a different tenant 110 in the same container 108 on the host computer 102 or another tenant 110 in a container 108 executing on a different computer. The routing component 410 might alternately instruct a load balancer (not shown in FIG. 4) or similar type of device or service to route requests 404 to a different tenant 110 on the same or different host computer 102.

Figure 5:
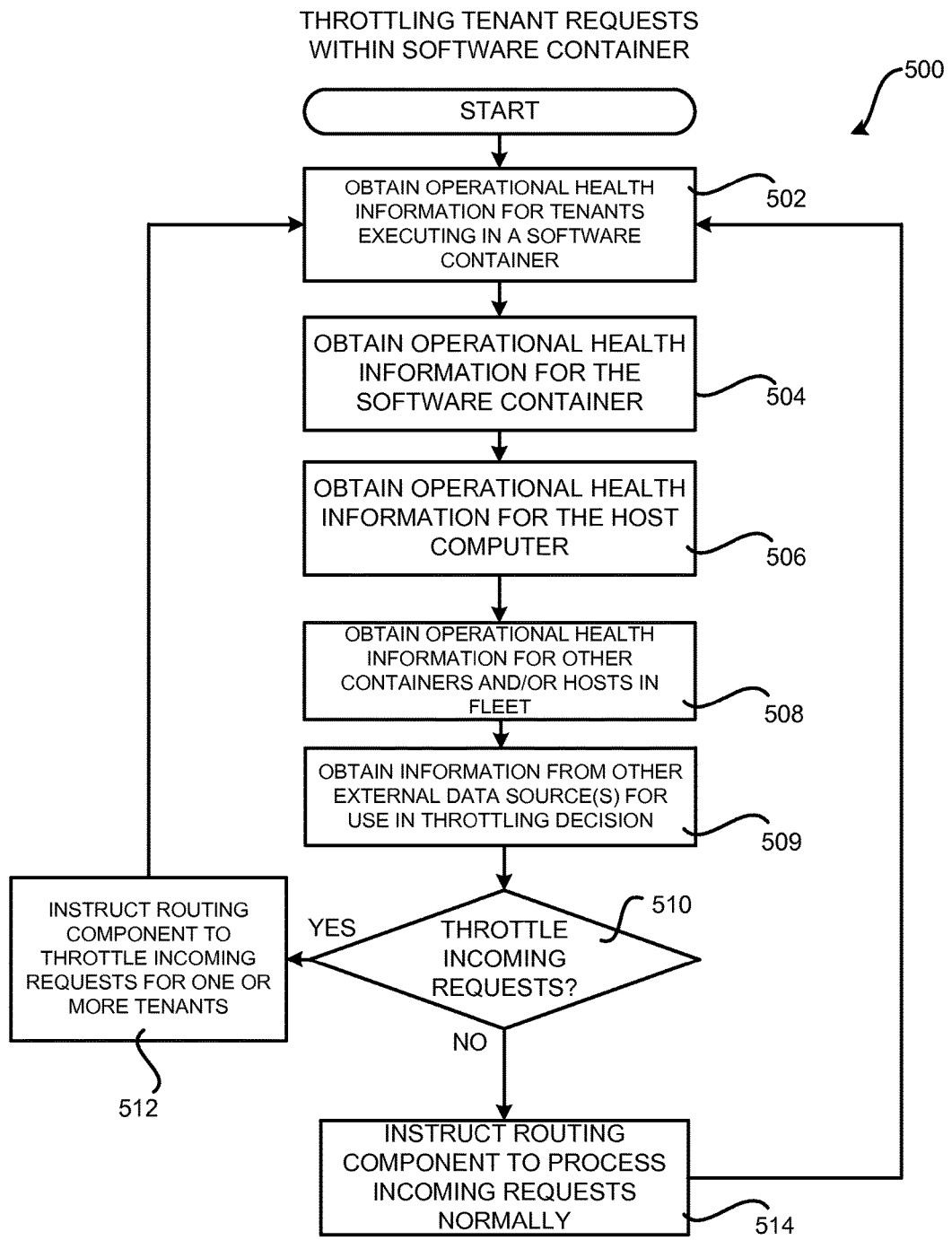
FIG. 5 is a flow diagram illustrating aspects of the mechanism shown in FIG. 4 for throttling requests directed to tenants of a software container.

FIG. 5 is a flow diagram showing a routine 500 that illustrates aspects of the mechanism shown in FIG. 4 for throttling requests 404 directed to the tenants 110 of a software container 108. The routine 500 begins at operation 502, where the request throttling logic 402 obtains the operational health information 406A for the tenants 110 executing in the software container 108. The routine 500 then proceeds from operation 502 to operation 504, where the request throttling logic 402 obtains the operational health information 406B for the software container 108. The routine 500 then proceeds from operation 504 to operation 506, where the request throttling logic 402 obtains the operational health information 406C for the host computer 102.

From operation 506, the routine 500 proceeds to operation 508, where the request throttling logic 402 may obtain the operational health information 406D for other host computers, software containers, and/or tenants in a fleet. The request throttling logic 402 might also obtain other information for use in determining whether to throttle requests 404 for one or more of the tenants 110 in other configurations.

From operation 508, the routine 500 proceeds to operation 509, where the request throttling logic 402 might obtain information from other data sources and/or services for use in determining whether requests 404 are to be throttled for one or more of the tenants 110. The routine 500 then proceeds to operation 510. At operation 510, the request throttling logic 402 determines whether to throttle incoming requests 404 for any of the tenants 110 executing in the software container 108. As discussed above with regard to FIG. 4, the request throttling logic 402 may determine whether to throttle requests 404 for one or more of the tenants 110 based, at least in part, upon the operational health information 406 obtained at operations 502-508. Some or all of the operational health information 406 may be utilized in this determination. Additionally, and as discussed above, the request throttling logic 402 may be instructed to throttle requests 404 for one or more of the tenants 110, such as by a throttling request 408 transmitted from a management console or another type of management system.

If the request throttling logic 402 determines at operation 510 that requests 404 for one or more tenants 110 are to be throttled, the routine 500 proceeds to operation 512. At operation 512, the routing component 410 is instructed to throttle the incoming requests 404 for one or more of the tenants 110. As discussed above, requests 110 might be throttled by rejecting some or all of the requests 404 or by queuing incoming requests 406 for delivery to tenants 110 at a later time. Other throttling mechanisms might also be utilized in other configurations.

The particular type of throttling that is utilized might be user-definable in some configurations. In other configurations, the type of throttling that is utilized might be based upon other factors or considerations, such as the size or type of the requests 404. For example, and without limitation, requests 404 not likely to significantly impact the operational performance of a tenant 404 might be queued while other requests 404 that might impact the performance of a tenant 404 may be dropped. From operation 512, the routine 500 proceeds back to operation 500, where the operations described above may be repeated.

If, at operation 510, the request throttling logic 402 determines that incoming requests 404 for the tenants 110 are not to be throttled, the routine 500 proceeds to operation 514. At operation 514, the routing component 410 is instructed to pass incoming requests 404 directly through to the destination tenant 110 in a normal fashion (i.e. without throttling). From operation 514, the routine 500 proceeds back to operation 502, where the operations described above may be repeated.

Priming of Software Containers

Mechanisms are also disclosed herein for priming a software container 108 following the initial execution of the software container 108 or following a restart. When running services on software containers 108 that are implemented utilizing a Java Virtual Machine ("JVM") and, potentially other types of software containers 108, the program code of the software container 108 and/or the tenant 110 that is executed is processed by a Just in Time ("JIT") compiler to as part of execution. After the program code has been executed a number of times (e.g. on the order of 10,000 executions), the JIT will start to optimize its execution and, instead, start persisting native code to execute rather than running the JIT. Until that time, the execution of a software container 108 and/or a tenant 110 can be noticeably slower. This cycle restarts every time the JVM is restarted. Therefore, tenants 110 affected by this will have a latency jump after every new activation.

In order to address the problem described just above, and potentially others, a mechanism is disclosed herein for priming a software container 108 prior to configuring the software container 108 to handle live network traffic. In particular, typical network traffic that is received and processed by a software container 108 may be recorded and stored. Once a software container 108 to be primed has been activated, the previously recorded network traffic (which might be referred to herein as "shadow traffic") may be "replayed" (i.e. transmitted) to the software container 108 in order to optimize execution of the software container 108. In one configuration, a remote service is called to prime a particular host computer 102 and is responsible for obtaining the network traffic and sending the network traffic to the host computer 102 to be primed. In another configuration, a process on the host computer 102 being primed may retrieve the shadow traffic and replay it against the local endpoint.

Once the execution of a software container 108 has been optimized in this fashion, the software container 108 may be added to a load balancer or other network infrastructure device or service in order to configure the software container 108 for processing live network traffic. Because the software container 108 has been primed in the manner described above, the software container 108 may immediately begin processing requests in an optimized fashion. Additional details regarding this process are provided below with regard to FIG. 6.

Figure 6:
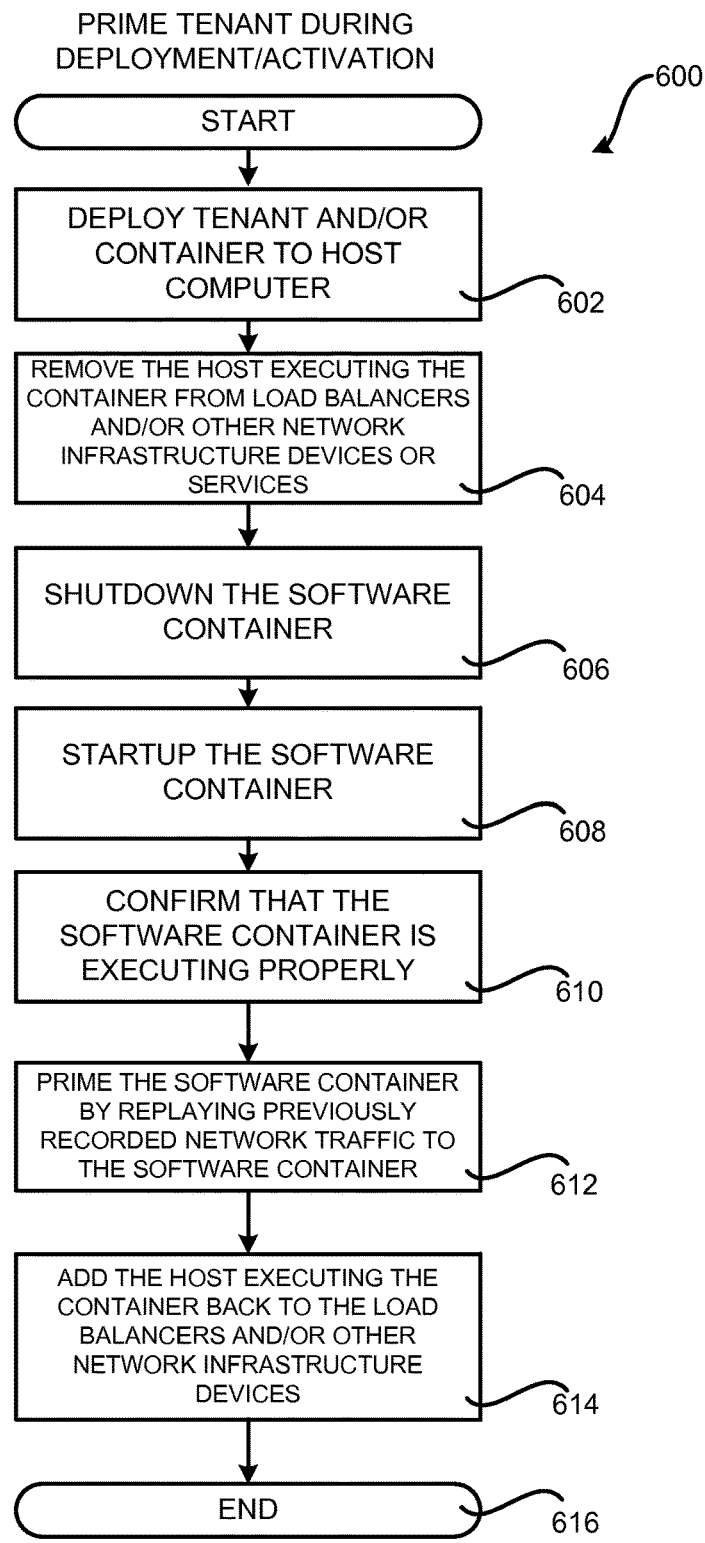
FIG. 6 is a flow diagram showing aspects of one illustrative routine disclosed herein for priming a software container in conjunction with the execution or restarting of the software container.

FIG. 6 is a flow diagram showing a routine 600 that illustrates aspects of one mechanism disclosed herein for priming a software container 108 in conjunction with the deployment or activation of a tenant 110 to the software container 108. As discussed above, prior to priming a software container 108 in the manner described below, actual network traffic that is received and processed by a software container 108 in a fleet may be recorded and stored. This "shadow traffic" may be used to prime the execution of a software container 108 prior to handling live requests in the manner described below.

The routine 600 begins at operation 602, where a tenant 110 or a container 108 may be deployed to a host computer 102. For example, a new version of a tenant 110A or a container 108 might be deployed to the host file system 202 of a host computer 102. The routine 600 then proceeds from operation 602 to operation 604, where the host computer 102 is removed from one or more load balancers and/or other networking infrastructure devices or services that route requests 404 to tenants 110 on the host computer 102. Removal of the host computer 102 from the load balancers and/or other networking infrastructure devices or services will ensure that no further requests 404 are routed to the host computer 102 while the software container 108 is being restarted and primed in the manner described below.

From operation 604, the routine 600 proceeds to operation 606, where the software container 108 is shut down. The software container 108 may be shut down in an orderly fashion so that any requests 404 currently being processed by the software container 108 are completed. As discussed above, new requests 404 will not be transmitted to the software container 108 while the software container 108 is being restarted and primed.

From operation 606, the routine 600 proceeds to operation 608, where execution of the software container 108 is restarted. The proper execution of the software container 108 is then verified at operation 610. Once the software container 108 is verified to be executing properly, the routine 600 proceeds to operation 612, where the previously recorded shadow traffic is replayed (i.e. transmitted) to the software container 108.

In one configuration, a remote service is called to prime a particular host computer 102 and is responsible for obtaining the network traffic and sending the network traffic to the host computer 102 to be primed. In another configuration, a process on the host computer 102 being primed may retrieve the shadow traffic and replay it against the local endpoint. As discussed briefly above, replaying the previously recorded shadow traffic to the software container 108 will cause the JIT will start to optimize its execution and, eventually, to persist native code to execute rather than running the JIT in some configurations. Other optimizations might also be realized by a software container 108 utilizing this mechanism.

Once playback of the shadow traffic has completed, the routine 600 proceeds from operation 612 to operation 614. At operation 614, the host computer 102 executing the software container 108 that was primed at operation 614 is added back to the load balancer and/or other networking infrastructure devices or services so that live requests 404 will again be routed to the host computer 102. The routine 600 then proceeds from operation 614 to operation 616, where it ends.

Figure 7:
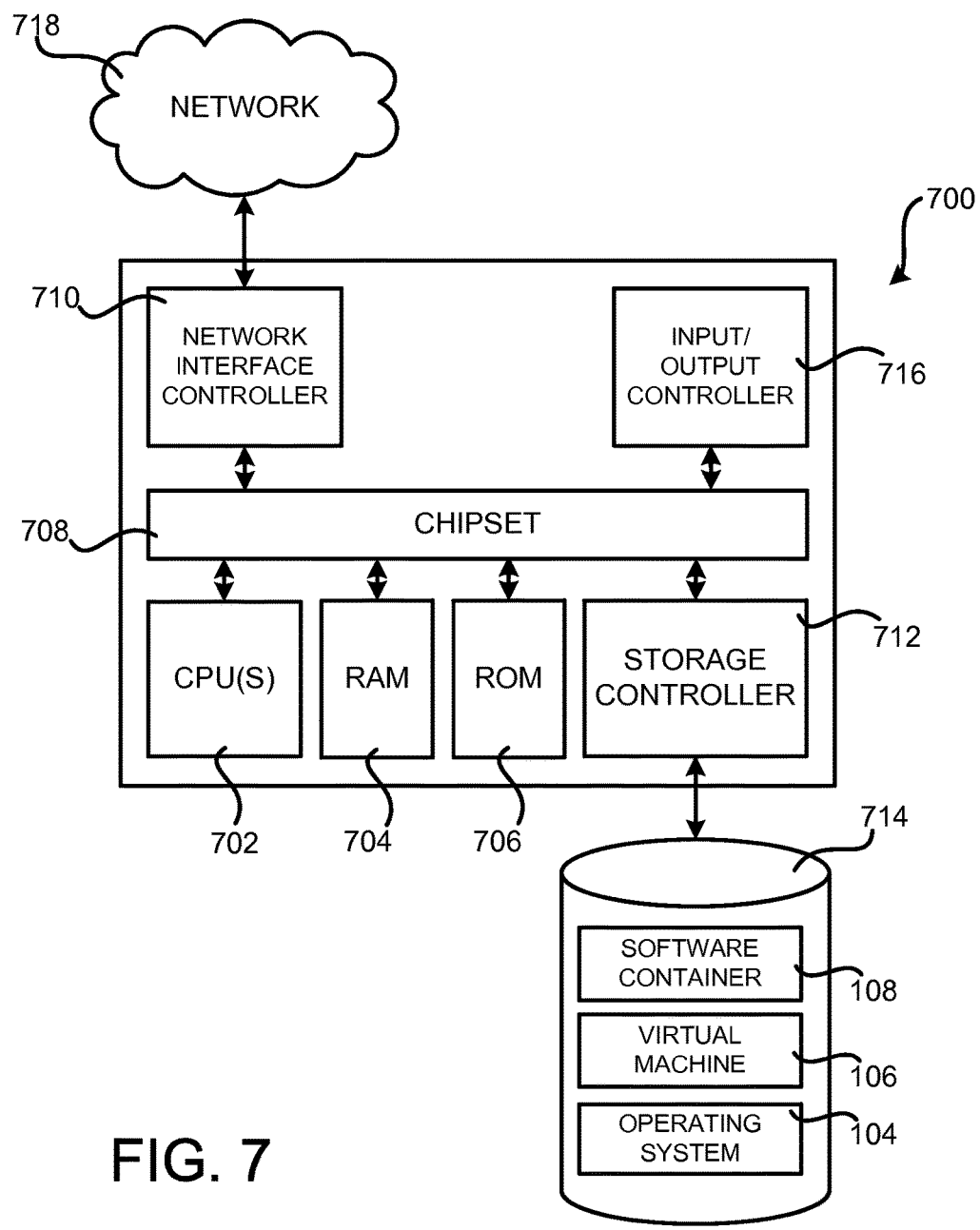
FIG. 7 is a computer architecture diagram showing an illustrative computer hardware architecture for a computing device that may be utilized to implement the various technologies presented herein.

FIG. 7 shows an example computer architecture for a computer 700 capable of executing the software components described herein for managed activation of tenants 110 and software containers 108, throttling of tenant requests 404, and for priming the execution of a software container 108. The computer architecture shown in FIG. 7 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 7 might be utilized to implement computer systems that execute one or more software components for implementing the functionality described above. Other types of hardware architectures might also be utilized.

The computer 700 includes a baseboard, or "motherboard," which is a printed circuit board to which a multitude of components or devices may be connected by way of a system bus or other electrical communication paths. In one illustrative configuration, one or more central processing units ("CPUs") 702 operate in conjunction with a chipset 708. The CPUs 702 are standard programmable processors that perform arithmetic and logical operations necessary for the operation of the computer 700.

The CPUs 702 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 708 provides an interface between the CPUs 702 and the remainder of the components and devices on the baseboard. The chipset 708 may provide an interface to a random access memory ("RAM") 704, used as the main memory in the computer 700. The chipset 708 may further provide an interface to a computer-readable storage medium such as a read-only memory ("ROM") 706 or non-volatile RAM ("NVRAM") for storing basic routines that help to startup the computer 700 and to transfer information between the various components and devices. The ROM 706 or NVRAM may also store other software components necessary for the operation of the computer 700 in accordance with the configurations described herein.

According to various configurations, the computer 700 may operate in a networked environment using logical connections to remote computing devices and computer systems through the network 718, such as a LAN, a WAN, the Internet, or any other networking topology known in the art that connects the computer 700 to remote computers. The chipset 708 includes functionality for providing network connectivity through a network interface controller ("NIC")

710, such as a gigabit Ethernet adapter. The NIC 710 is capable of connecting the computer 700 to other computing devices over the network 718. It should be appreciated that multiple NICs 710 may be present in the computer 700, connecting the computer 700 to various types of networks and remote computer systems.

The computer 700 may be connected to a mass storage device 714 that provides non-volatile storage for the computer 700. The mass storage device 714 may store system programs, application programs, other program modules, and data, which are described in greater detail herein. The mass storage device 714 may be connected to the computer 700 through a storage controller 712 connected to the chipset 708. The mass storage device 714 may consist of one or more physical storage units. The storage controller 712 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 700 may store data on the mass storage device 714 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 714 is characterized as primary or secondary storage, and the like.

For example, the computer 700 may store information to the mass storage device 714 by issuing instructions through the storage controller 712 to alter the magnetic characteristics of a particular location within a magnetic disk drive unit, the reflective or refractive characteristics of a particular location in an optical storage disk, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 714 by detecting the physical states or characteristics of one or more particular locations within the physical storage units.

In addition to the mass storage device 714 described above, the computer 700 may have access to other computer-readable storage media to store and retrieve information, such as program modules, data structures, or other data. It should be appreciated by those skilled in the art that computer-readable storage media can be any available non-transitory media that may be accessed by the computer 700. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 714 may store an operating system 104 utilized to control the operation of the computer 700. According to one configuration, the operating system comprises the LINUX operating system. According to another configuration, the operating system comprises the WINDOWS® SERVER operating system from MICROSOFT Corporation of Redmond, Wash. According to further configurations, the operating system may comprise the UNIX operating system. It should be appreciated that other operating systems may also be utilized. The mass storage device 714 may store other system or application programs and data utilized by the computer 700. For example, the mass storage device 714 may store the virtual machine 106 and the software container 108 described above. As discussed above with regard to FIG. 1, a virtual machine 106 is not necessary for use with the software container 108. The mass storage device 714 might also store other programs and data not specifically identified herein.

In one configuration, the mass storage device 714 or other computer-readable storage media may be encoded with computer-executable instructions that, when loaded into the computer 700, may transform the computer from a general-purpose computing system into a special-purpose computer capable of implementing the configurations described herein. These computer-executable instructions transform the computer 700 by specifying how the CPUs 702 transition between states, as described above. According to one configuration, the computer 700 may have access to computer-readable storage media, such as an optical disk, a solid-state storage device, or a magnetic storage device, storing computer-executable instructions that, when executed by the computer 700, perform the various routine described above with regard to FIGS. 3A, 3B, 5, and 6.

The computer 700 might also include an input/output controller 716 for receiving and processing input from a number of input devices, such as a keyboard, a mouse, a touchpad, a touch screen, an electronic stylus, and/or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that various concepts and technologies for managing the activation of software containers, for throttling of tenant requests, and for priming the execution of software containers have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter disclosed herein can be considered to include the subject matter recited in the following clauses.

Clause 1. A non-transitory computer-readable storage medium having computer-executable instructions stored thereupon which, when executed by a computer, cause the computer to:

execute a software container in a process on a host computer, the software container configured to execute a plurality of tenants in the process;

obtain, by way of the software container, operational health information regarding the plurality of tenants, operational health information regarding the host computer, or operational health information regarding one or more other software containers or host computers;

determine at the software container whether to throttle incoming requests for at least one of the plurality of tenants based, at least in part, on the operational health information; and throttle at least a portion the incoming requests for at least one of the plurality of tenants by way of the software container based upon the determination.

Clause 2. The non-transitory computer-readable storage medium of clause 1, wherein throttle the incoming requests by way of the software container comprises rejecting at least a portion of the incoming requests for at least one of the plurality of tenants.

Clause 3. The non-transitory computer-readable storage medium of clauses 1 and 2, wherein throttle the incoming requests by way of the software container comprises queuing at least a portion of the incoming requests for at least one of the plurality of tenants for processing at a future time.

Clause 4. The non-transitory computer-readable storage medium of clauses 1-3, wherein the incoming requests for at least one of the plurality of tenants are throttled by the software container in response to receiving a request to throttle the incoming requests.

Clause 5. A computer, comprising:

a processor; and a non-transitory computer-readable storage medium having computer-executable instructions stored thereupon which, when executed by the processor, cause the computer to execute a software container in a process on the computer, the software container configured to execute one or more tenants in the process, obtain operational health information by way of the software container, determine at the software container whether to throttle incoming requests for at least one of the one or more tenants based, at least in part, on the operational health information, and throttle at least a portion the incoming requests for at least one of the one or more tenants by way of the software container based upon the determination.

Clause 6. The computer of clause 5, wherein the operational health information comprises operational health information for the one or more tenants.

Clause 7. The computer of clauses 5 and 6, wherein the operational health information comprises operational health information for the software container.

Clause 8. The computer of clauses 5-7, wherein the operational health information comprises operational health information for the computer.

Clause 9. The computer of clauses 5-8, wherein the operational health information comprises operational health information for one or more other tenants executing in another software container on another computer, another software container, or another computer.

Clause 10. The computer of clauses 5-9, wherein the non-transitory computer-readable storage medium has computer-executable instructions stored thereupon which, when executed by the processor, cause the computer to obtain data from one or more data sources, and wherein the determination as to whether to throttle the incoming requests is based, at least in part, on the obtained data.

Clause 11. The computer of clauses 5-10, wherein throttle at least a portion the incoming requests for at least one of the one or more tenants by way of the software container comprises routing at least a portion of the incoming requests to another tenant.

Clause 12. The computer of clauses 5-11, wherein throttle at least a portion the incoming requests for at least one of the one or more tenants by way of the software container comprises instructing a load balancer to route at least a portion of the incoming requests to another tenant.

Clause 13. A computer-implemented method for throttling requests received at a software container for one or more tenants executing in the software container, the method comprising:

obtaining operational health information;

determining whether to throttle incoming requests for one or more tenants executing in a software container based, at least in part, on the obtained operational health information; and causing at least a portion the incoming requests for at least one of the one or more tenants to be throttled based upon the determination.

Clause 14. The computer-implemented method of clause 13, wherein the operational health information is obtained by request throttling logic executing in the software container.

Clause 15. The computer-implemented method of clauses 13-14, wherein a component executing in the software container throttles the incoming requests.

Clause 16. The computer-implemented method of clauses 13-15, wherein the operational health information comprises operational health information for the one or more tenants, for the software container, or for the computer.

Clause 17. The computer-implemented method of clauses 13-16, wherein the operational health information comprises operational health information for one or more other tenants executing in-process in another software container on another computer.

Clause 18. The computer-implemented method of clauses 13-18, wherein the operational health information comprises operational health information for another software container.

Clause 19. The computer-implemented method of clauses 13-18, wherein the operational health information comprises operational health information for another computer.

Clause 20. The computer-implemented method of clauses 13-19, wherein throttling at least a portion the incoming requests for at least one of the one or more tenants by way of the software container comprises rejecting at least a portion of the incoming requests for at least one of the one or more tenants, queuing at least a portion of the incoming requests for at least one of the one or more tenants for processing at a future time, routing at least a portion of the incoming requests to a different tenant, or instructing a load balancer to re-route at least a portion of the incoming requests.

Clause 21. A non-transitory computer-readable storage medium having computer-executable instructions stored thereupon which, when executed by a computer, cause the computer to:

execute an activation process on the computer, the activation process configured to place an activation request for a software container or a tenant on an activation queue; and execute an activation manager on the computer, the activation manager configured to examine the activation queue to determine whether a software container or a tenant is to be activated on the computer, and wherein the activation manager is further configured to cause a software container to be executed on the computer in response to determining that a software container is to be activated on the computer, and cause a tenant to be executed in a software container executing on the host computer response to determining that the tenant is to be activated.

Clause 22. The non-transitory computer-readable storage medium of clause 21, wherein the activation queue is located on a file system of the host computer, in a network location, or maintained by a network service.

Clause 23. The non-transitory computer-readable storage medium of clauses 21 and 22, having further computer-executable instructions stored thereupon to prime execution of the software container by replaying previously recorded network traffic to the software container.

Clause 24. The non-transitory computer-readable storage medium of clauses 21-23, having further computer-executable instructions stored thereupon to:

determine if requests to activate tenants are to be throttled; and deny an activation request or postpone the processing of an activation request in response to determining that requests to activate tenants are to be throttled.

Clause 25. The non-transitory computer-readable storage medium of clauses 21-24, wherein the activation queue comprises a first-in first-out ("FIFO") queue or a prioritized list.

Clause 26. A computer for managed activation of a software container or a tenant on the computer, the computer comprising:

a processor; and a non-transitory computer-readable storage medium having computer-executable instructions stored thereupon which, when executed by the processor, cause the computer to add an activation request for a first software component or a second software component to a collection of activation requests, examine the collection of activation requests to determine whether the first software component or a tenant is to be activated on the computer, cause the first software component to be executed on the processor in response to determining that the first software component is to be executed on the computer, and cause the second software component to be executed in the first software component in response to determining that the second software component is to be activated on the computer.

Clause 27. The computer of clause 26, wherein the first software component comprises a software container and wherein the second software component comprises a tenant configured for execution in the software container.

Clause 28. The computer of clauses 26 and 27, wherein a first activation process executes on the processor to place the activation request into the collection of activation requests, and wherein the activation request comprises a request to activate the first software component on the computer.

Clause 29. The computer of clauses 26-28, wherein a second activation process executes on the processor to place the activation request into the collection of activation requests, and wherein the activation request comprises a request to activate the second software component on the computer.

Clause 30. The computer of clauses 26-29, wherein an activation manager executes on the processor to examine the collection of activation requests to determine whether the first software component or the second software component is to be activated on the computer.

Clause 31. The computer of clauses 26-30, wherein a software container executes on the processor that is configured to examine the collection of activation requests to determine whether the second software component is to be activated, and wherein the software container is further configured to cause the second software component to be executed in the software container in response to determining that the second software component is to be activated on the computer.

Clause 32. The computer of clauses 26-31, wherein the non-transitory computer-readable storage medium has further computer-executable instructions stored thereupon to prime execution of the first software component by replaying previously recorded network traffic to the first software component.

Clause 33. The computer of clauses 26-32, wherein the collection of activation requests comprises an activation queue located on a file system of the computer, in a network location, or maintained by a network service.

Clause 34. The computer of clauses 26-33, wherein the non-transitory computer-readable storage medium has further computer-executable instructions stored thereupon to:

determine if requests to activate the second software component are to be throttled; and deny an activation request or postpone the processing of an activation request in response to determining that requests to activate the second software component are to be throttled.

Clause 35. A computer-implemented method for managing the activation of software components on a host computer, the method comprising:

executing an activation process configured to place an activation request for a first software component or a second software component into a collection of activation requests;

determining, based upon the collection of activation requests, whether the first software component or the second software component is to be activated on the host computer;

causing the first software component to be executed on the host computer in response to determining that the first software component is to be activated on the host computer; and causing the second software component to be executed in the first software component executing on the host computer in response to determining that the second software component is to be activated on the host computer.

Clause 36. The computer-implemented method of clause 35, wherein an activation manager executes on the host computer that is configured to determine, based upon the collection of activation requests, whether the first software component or the second software component is to be activated on the host computer.

Clause 37. The computer-implemented method of clauses 35 and 36, wherein the first software component comprises a software container and wherein the second software component comprises a tenant configured for execution in the software container.

Clause 38. The computer-implemented method of clauses 35-37, wherein the collection of activation requests comprises a queue maintained on a file system of the host computer, in a network location, or by a network service.

Clause 39. The computer-implemented method of clauses 35-38, wherein the collection of activation requests comprises a first-in first-out ("FIFO") queue or a prioritized list.

Claus 40. The computer-implemented method of clauses 35-39, further comprising:

determining if activation requests for the second software component are to be throttled; and denying an activation request or postponing the processing of an activation request in response to determining that activation requests for the second software component are to be throttled.

Clause 41. A non-transitory computer-readable storage medium having computer-executable instructions stored thereupon which, when executed by a computer, cause the computer to:

receive a request from a tenant to activate the tenant in a software container;

in response to receiving the request, determine whether the request indicates that the software container is to be restarted prior to activating the tenant in the software container;

in response to determining that the software container is to be restarted prior to activating the tenant in the software container, determine if the tenant is authorized to request an activation that includes a restart of the software container; and in response to determining that the tenant is authorized to request an activation that includes a restart of the software container, terminate execution of the software container,
restart execution of the software container, and
activate the tenant in the software container.

Clause 42. The non-transitory computer-readable storage medium of clause 41, having further computer-executable instructions stored thereupon to activate the tenant in the software container without restarting execution of the software container in response to determining that the request indicates that the software container is not to be restarted prior to activating the tenant in the software container.

Clause 43. The non-transitory computer-readable storage medium of clauses 41 and 42, having further computer-executable instructions stored thereupon to perform a hot swap activation of the tenant in response to determining that the tenant is not authorized to request an activation that includes a restart of the software container.

Clause 44. The non-transitory computer-readable storage medium of clauses 41-43, having further computer-executable instructions stored thereupon to deny the request from the tenant to activate the tenant in the software container based upon operational health information associated with the software container, a host computer executing the software container, or one or more other software containers or host computers.

Clause 45. The non-transitory computer-readable storage medium of clauses 41-44, having further computer-executable instructions stored thereupon to:

determine whether the tenant is experiencing an operational issue; and in response to determining that the tenant is experiencing an operational issue, terminate execution of the software container,
restart execution of the software container, and
activate the tenant in the software container.

Clause 46. The non-transitory computer-readable storage medium of clauses 41-45, having further computer-executable instructions stored thereupon to prime execution of the software container by replaying previously recorded network traffic to the software container following restarting execution of the software container.

Clause 47. The non-transitory computer-readable storage medium of clauses 41-46, having further computer-executable instructions stored thereupon to:

expose an application programming interface for receiving a request to perform an activation of a tenant by restarting execution of the software container and activating the tenant therein;

receive a request to perform an activation by way of the API; and in response to receiving the request by the API,
terminate execution of the software container,
restart execution of the software container, and
activate the tenant in the software container.

Clause 48. A computer for activation of tenant in a software container on the computer, the computer comprising:

a processor; and a non-transitory computer-readable storage medium having computer-executable instructions stored thereupon which, when executed by the processor, cause the computer to receive a request from the tenant to activate the tenant in the software container, in response to receiving the request, determine the software container is to be restarted prior to activating the tenant in the software container, and in response to determining that the software container is to be restarted prior to activating the tenant in the software container, terminating execution of the software container,
restarting execution of the software container, and
activating the tenant in the software container.

Clause 49. The computer of clause 48, wherein the non-transitory computer-readable storage medium has further computer-executable instructions stored thereupon to:

determine if the tenant is authorized to request an activation that includes a restart of the software container; and in response to determining that the tenant is authorized to request an activation that includes a restart of the software container, performing the requested restart of the software container and the requested activation of the tenant.

Clause 50. The computer of clauses 48 and 49, wherein the non-transitory computer-readable storage medium has further computer-executable instructions stored thereupon to activate the tenant in the software container without restarting execution of the software container in response to determining that the request indicates that the software container is not to be restarted prior to activating the tenant in the software container.

Clause 51. The computer of clauses 48-50, wherein the non-transitory computer-readable storage medium has further computer-executable instructions stored thereupon to perform a hot swap activation of the tenant in response to determining that the tenant is not authorized to request an activation that includes a restart of the software container.

Clause 52. The computer of clauses 48-51, wherein the non-transitory computer-readable storage medium has further computer-executable instructions stored thereupon to deny the request if it is determined that the tenant is not authorized to request activation.

Clause 53. The computer of clauses 48-52, wherein the non-transitory computer-readable storage medium has further computer-executable instructions stored thereupon to deny the request from the tenant to activate the tenant in the software container based upon operational health information associated with the software container, a host computer executing the software container, or one or more other software containers or host computers.

Clause 54. The computer of clauses 48-53, wherein the non-transitory computer-readable storage medium has further computer-executable instructions stored thereupon to prime execution of the software container by replaying previously recorded network traffic to the software container following restarting execution of the software container.

Clause 55. A computer-implemented method for activating a tenant in a software container, comprising:

determining whether the software container is to be restarted prior to activating the tenant in the software container; and in response to determining that the software container is to be restarted prior to activating the tenant in the software container, terminating execution of the software container, restarting execution of the software container, and activating the tenant for execution in the software container.

Clause 56. The computer-implemented method of clause 55, further comprising:

receiving a request to activate the tenant in the software container; and in response to receiving the request, determining whether the software container is to be restarted prior to activating the tenant in the software container based upon the request.

Clause 57. The computer-implemented method of clauses 55 and 56, further comprising:

determining if the tenant is authorized to request an activation that includes a restart of the software container; and in response to determining that the tenant is authorized to request an activation that includes a restart of the software container, performing the requested restart of the software container and the requested activation of the tenant.

Clause 58. The computer-implemented method of clauses 55-57, further comprising activating the tenant in the software container without restarting execution of the software container in response to determining that the software container is not to be restarted prior to activating the tenant in the software container.

Clause 59. The computer-implemented method of clauses 55-58, further comprising performing a hot swap activation of the tenant in response to determining that the tenant is not authorized to request an activation that includes a restart of the software container.

Clause 60. The computer-implemented method of clauses 55-59, denying the request from the tenant to activate the tenant in the software container based upon operational health information associated with the software container, a host computer executing the software container, or one or more other software containers or host computers.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:

receive a first request from a tenant to activate the tenant in a software container, the tenant comprising an application executable in the software container;

determine that the first request indicates that, prior to activating the tenant in the first software container, execution of the software container is to be terminated, and then the execution of the software container is to be restarted;

transmit a second request to an authorization system to inquire whether the tenant is authorized to request an activation that includes a restart of the software container;

receive, from the authorization system, a response indicating that the tenant is so authorized to request the activation; and based at least in part on determining that the tenant is authorized to request the activation:

terminate the execution of the software container;

restart the execution of the software container;

activate the tenant in the software container; and prime the execution of the software container by replaying previously recorded network traffic to the software container following restarting the execution of the software container.

2. The non-transitory computer-readable storage medium of claim 1, having further computer-executable instructions stored thereupon to, after the tenant has been activated in the software container:

determine that the tenant is experiencing an operational issue;

terminate the execution of the software container;

restart the execution of the software container; and activate the tenant in the software container.

3. The non-transitory computer-readable storage medium of claim 1, having further computer-executable instructions stored thereupon to:

expose an application programming interface (API) for receiving a third request to activate the tenant in the software container by restarting the execution of the software container and activating the tenant therein;

receive the third request by way of the API; and in response to receiving the third request by the API, terminate the execution of the first software container, restart the execution of the first software container, and activate the tenant in the first software container.

4. The non-transitory computer-readable storage medium of claim 1, having further computer-executable instructions stored thereupon to:

determine to throttle incoming requests for at least one tenant of a plurality of tenants of the software container; and throttle the incoming requests by rejecting at least a portion of the incoming requests for the at least one tenant.

5. The non-transitory computer-readable storage medium of claim 1, having further computer-executable instructions stored thereupon to:

determine to throttle incoming requests for at least one tenant of a plurality of tenants of the software container; and throttle the incoming requests by queueing at least a portion of the incoming requests for the at least one tenant for processing at a future time.

6. The non-transitory computer-readable storage medium of claim 1, having further computer-executable instructions stored thereupon to:

receive a request to throttle incoming requests for one or more tenants of a plurality of tenants of the software container; and throttle the incoming requests for the one or more tenants by denying or queueing at least a portion of the incoming requests for the one or more tenants.

7. A computer for activation of tenant in a software container on the computer, the computer comprising:
   a processor; and
   a non-transitory computer-readable storage medium having computer-executable instructions stored thereupon which, when executed by the processor, cause the computer to:
     receive a first request from a tenant to activate the tenant in a software container, the tenant being executable in the software container;
     determine whether the tenant is authorized to request an activation that includes a restart of the software container;
     based at least in part on a first determination that the tenant is authorized to request the activation:
       terminate the execution of the software container;
       restart the execution of the software container;
       activate the tenant in the software container; and
       prime the execution of the software container by replaying previously recorded network traffic to the software container following restarting the execution of the software container; or
     based at least in part on a second determination that the tenant is not se authorized to request the activation:
       activate the tenant in the software container without terminating and restarting the execution of the software container.

8. The computer of claim 7, wherein the non-transitory computer-readable storage medium has further computer-executable instructions stored thereupon to cause the computer to determine whether the tenant is authorized to request the activation that includes the restart of the software container by:
   transmitting a second request to an authorization system to inquire whether the tenant is authorized to request the activation; and
   receiving, from the authorization system, a response either indicating that the tenant is authorized to request the activation or indicating that the tenant is not authorized to request the activation.

9. The computer of claim 7, wherein terminating the execution of the software container comprises:
   completing one or more processes associated with one or more other tenants executing on the software container; and
   terminating the execution of the software container after completion of the one or more processes.

10. The computer of claim 7, wherein the non-transitory computer-readable storage medium has further computer-executable instructions stored thereupon to cause the computer to:
    execute the software container in a process on the computer, the software container configured to execute one or more tenants in the process, the tenant being one of the one or more tenants in the process;
    obtain operational health information by way of the software container;
    determine at the software container to throttle incoming requests for at least one of the one or more tenants based, at least in part, on the operational health information; and
    throttle at least a portion the incoming requests for at least one of the one or more tenants by way of the software container.

11. The computer of claim 10, wherein the operational health information comprises operational health information for the at least one tenant.

12. The computer of claim 10, wherein the operational health information comprises operational health information for the software container.

13. The computer of claim 10, wherein the operational health information comprises operational health information for the computer.

14. The computer of claim 7, wherein the non-transitory computer-readable storage medium has further computer-executable instructions stored thereupon to cause the computer to:
    determine at the software container to throttle incoming requests for at least one tenant of a plurality of tenants, the tenant being one of the plurality of tenants;
    throttle at least a portion of the incoming requests for the at least one tenant by way of the software container by routing at least a portion of the incoming requests to another tenant.

15. The computer of claim 7, wherein the non-transitory computer-readable storage medium has further computer-executable instructions stored thereupon to cause the computer to:
    determine at the software container to throttle incoming requests for at least one tenant of a plurality of tenants, the tenant being one of the plurality of tenants; and
    throttle at least a portion of the incoming requests for the at least one tenant by way of the software container by instructing a load balancer to route at least a portion of the incoming requests to another tenant.

16. A computer-implemented method for activating a tenant in a software container, comprising:
    receiving a first request from the tenant to activate the tenant in the software container, wherein the first request indicates that, prior to activating the tenant in the software container, execution of the software container is to be terminated, and then the execution of the software container is to be restarted;
    in response to receiving the first request, transmitting a second request to an authorization system to inquire whether the tenant is authorized to request an activation that includes a restart of the software container;
    in response to transmitting the second request, receiving, from the authorization system, a first response;
    based at least in part on a first determination that the first response indicates that the tenant is not authorized to request activation that includes the restart of the software container then:
      refrain from terminating the execution of the software container, and
      activating the tenant in the software container without terminating and
    restarting the execution of the software container; or
    based at least in part on a second determination that the first response indicates that the tenant is authorized to request the activation that includes the restart of the software container then:
      terminating the execution of the software container:
      restarting the execution of the software container;
      priming the execution of the software container by replaying previously recorded network traffic to the software container following restarting the execution of the second software container; and
      activating the tenant in the software container.

17. The computer-implemented method of claim 16, further comprising:

in response to receiving the first request, determining whether the software container is to be restarted prior to activating the tenant in the software container based upon the first request.

18. The computer-implemented method of claim 16, wherein activating the tenant comprises:
performing a hot swap activation of the tenant in the software container.

19. The computer-implemented method of claim 16, wherein the first response indicates that the tenant is not se-authorized to request the authorization, and the first response is based at least in part upon operational health information associated with the software container, a host computer executing the software container, or one or more other software containers or host computers.

20. The computer-implemented method of claim 16 and, subsequent to activating the tenant in the software container, further comprising:
determining to throttle incoming requests for the tenant; and
throttling the incoming requests by at least one of: rejecting at least a portion of the incoming requests, or queueing at least a portion of the incoming requests for processing at a future time.

21. The computer-implemented method of claim 16, and further comprising:
determine that incoming requests to activate tenants in the software container are to be throttled; and
deny an activation request or postpone the processing of an incoming activation request for a tenant in the software container.

\* \* \* \* \*